United States Patent

Yada et al.

[11] Patent Number: 5,837,297
[45] Date of Patent: Nov. 17, 1998

[54] AUTOMOBILE WINDSHIELD MOLDING AND THE METHOD OF PRODUCING THE SAME

[75] Inventors: Yukihiko Yada; Tosikazu Ito, both of Nagoya, Japan

[73] Assignee: Tokai Kogyo Kabushiki Kaisha, Ohbu, Japan

[21] Appl. No.: 660,925

[22] Filed: Jun. 10, 1996

Related U.S. Application Data

[63] Continuation of Ser. No. 579,806, Dec. 28, 1995, abandoned, which is a continuation-in-part of Ser. No. 475,618, Jun. 7, 1995, Pat. No. 5,567,449, which is a division of Ser. No. 291,088, Aug. 18, 1994, Pat. No. 5,474,729, which is a division of Ser. No. 192,623, Feb. 7, 1994, Pat. No. 5,374,096, which is a continuation of Ser. No. 781,371, Oct. 23, 1991, abandoned.

[30] Foreign Application Priority Data

Oct. 23, 1990 [JP] Japan .................................. 2-283344
Dec. 28, 1994 [JP] Japan .................................. 6-338728

[51] Int. Cl.⁶ .................................................. B29C 47/12
[52] U.S. Cl. .......................... 425/381; 425/465; 425/466; 264/167
[58] Field of Search ................................. 425/113, 133.1, 425/465, 466, 467, 380, 381, 382.3, 131.1; 264/177.1, 177.16, 167

[56] References Cited

U.S. PATENT DOCUMENTS

| | | | |
|---|---|---|---|
| 4,256,685 | 3/1981 | Vassar | 264/167 |
| 4,576,773 | 3/1986 | Azzola et al. | 425/465 |
| 4,584,150 | 4/1986 | Ballocca | 425/135 |
| 4,757,659 | 7/1988 | Miyakawa et al. | 296/93 |
| 4,867,667 | 9/1989 | Moriyama | 425/465 |
| 4,960,375 | 10/1990 | Saito et al. | 425/465 |
| 5,061,335 | 10/1991 | Tamura et al. | 264/177.1 |
| 5,567,449 | 10/1996 | Yada | 425/381 |

*Primary Examiner*—Khanh P. Nguyen
*Attorney, Agent, or Firm*—Oblon, Spivak, McClelland, Maier & Neustadt, P.C.

[57] ABSTRACT

An apparatus for producing an automobile windshield molding for sealing a space between a windshield and a periphery of a window opening of a vehicle body panel utilizes cooperating dies. The windshield molding comprises a pair of extruded side molding parts, a pair of extruded corner molding parts, and an extruded upper molding part integral with and extending between the side and corner molding parts. Each of the side molding parts associated with each side edge of the windshield is larger in thickness compared to the upper and corner molding parts, where a water drain channel is formed.

14 Claims, 31 Drawing Sheets

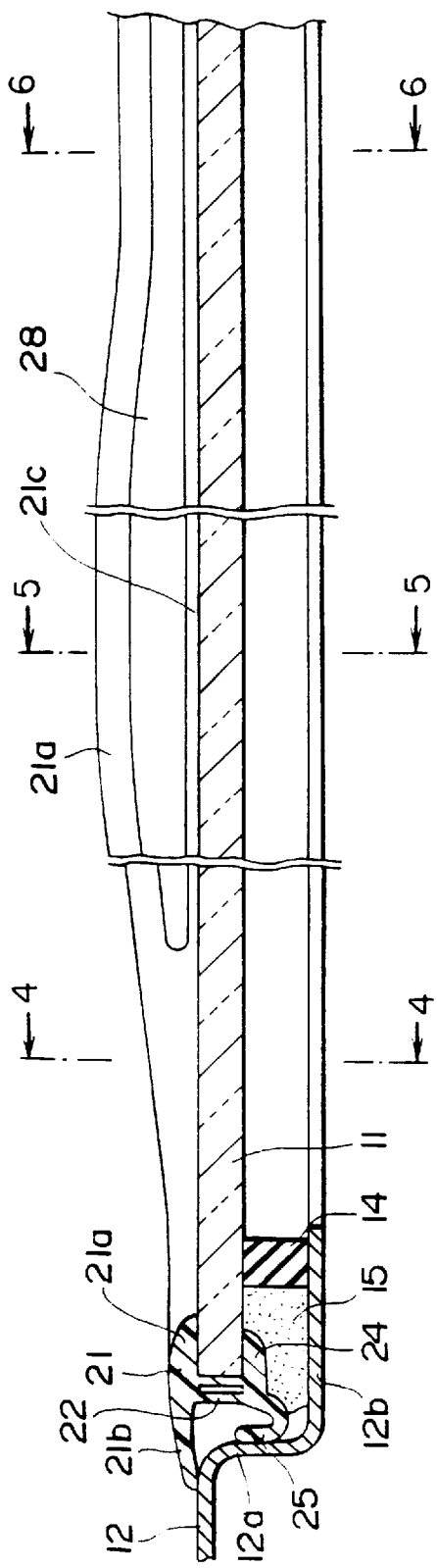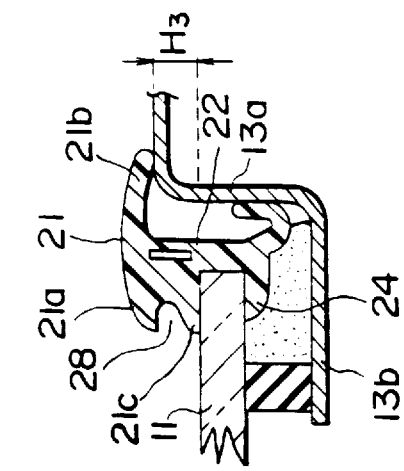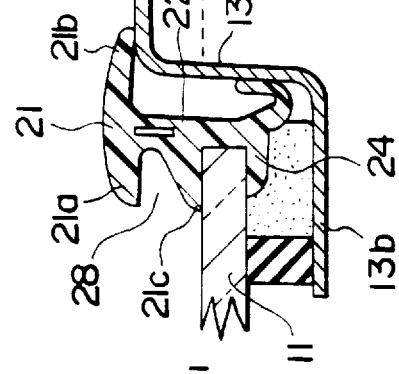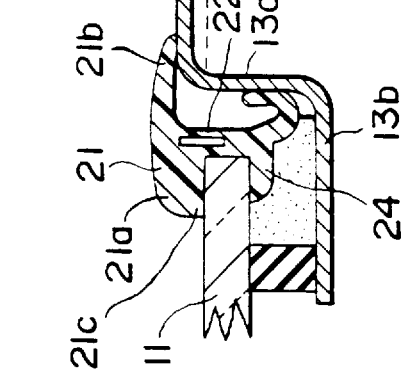

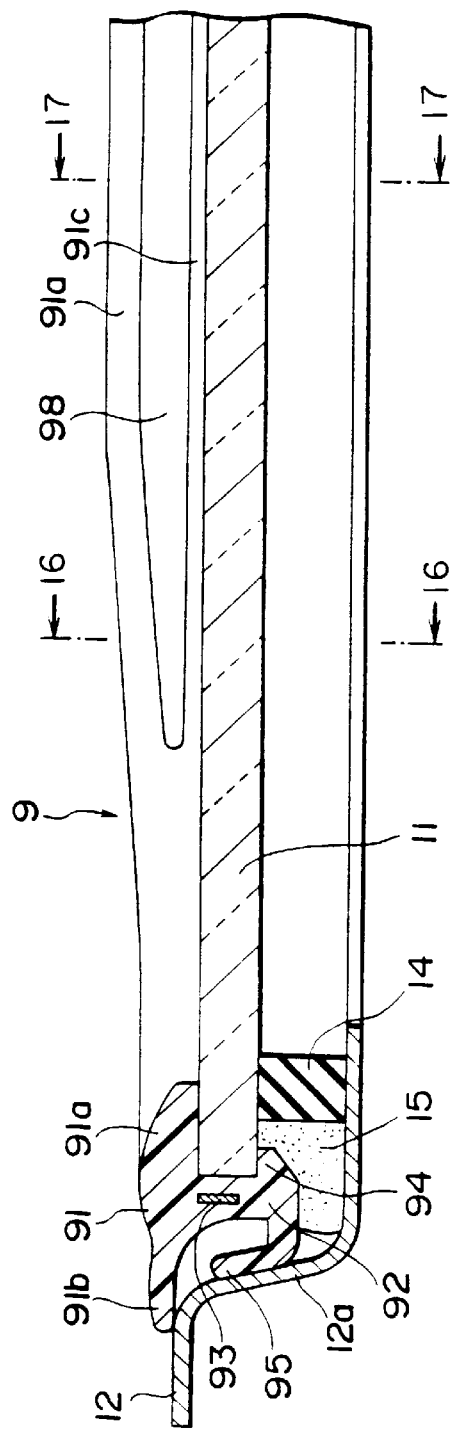
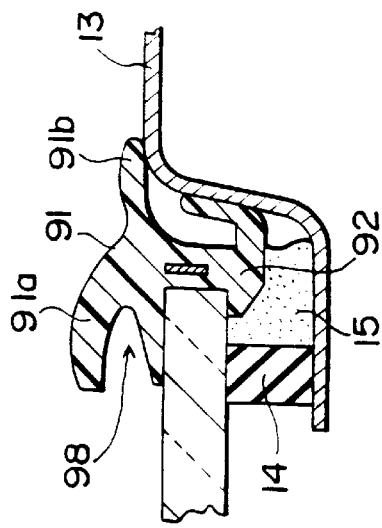
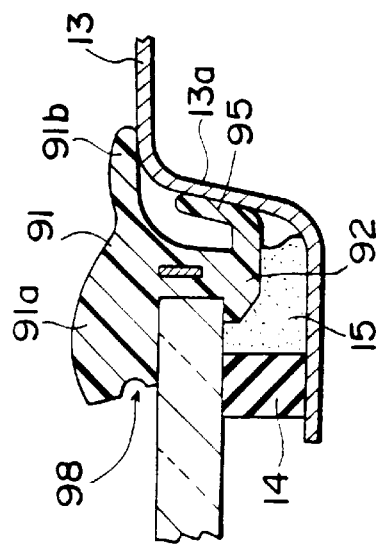

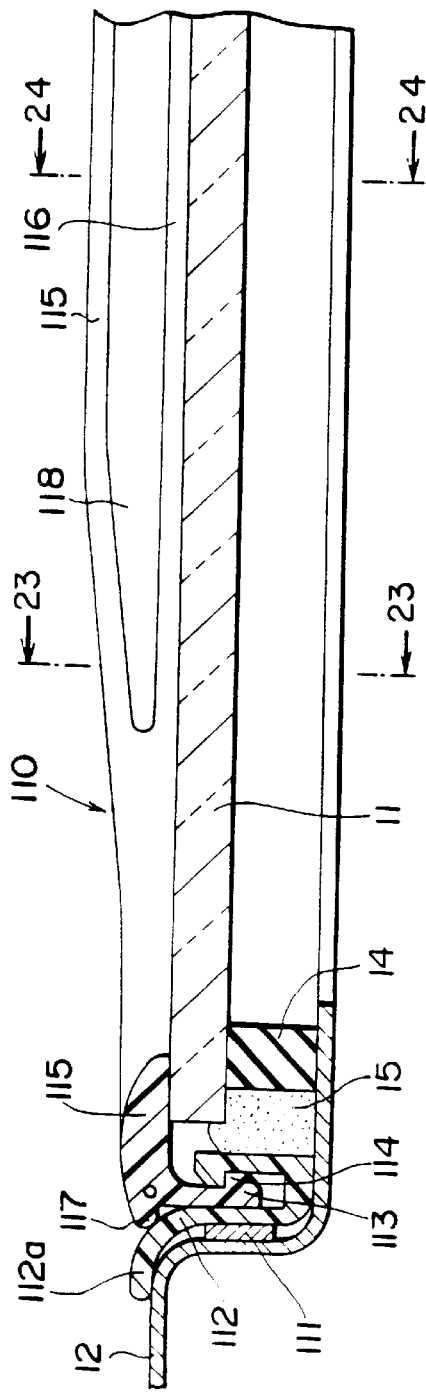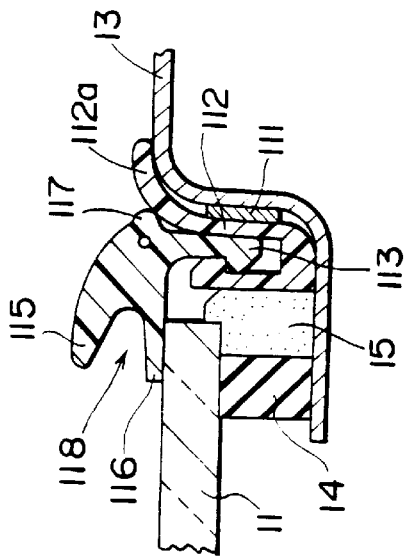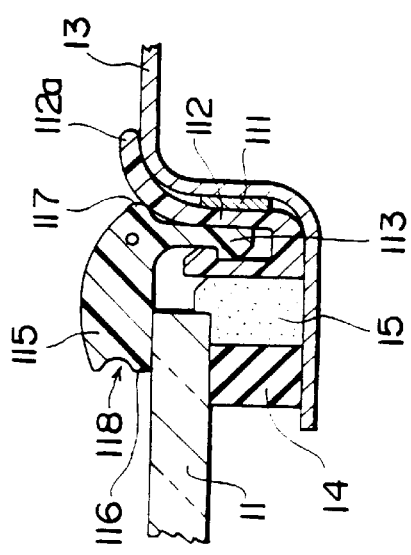

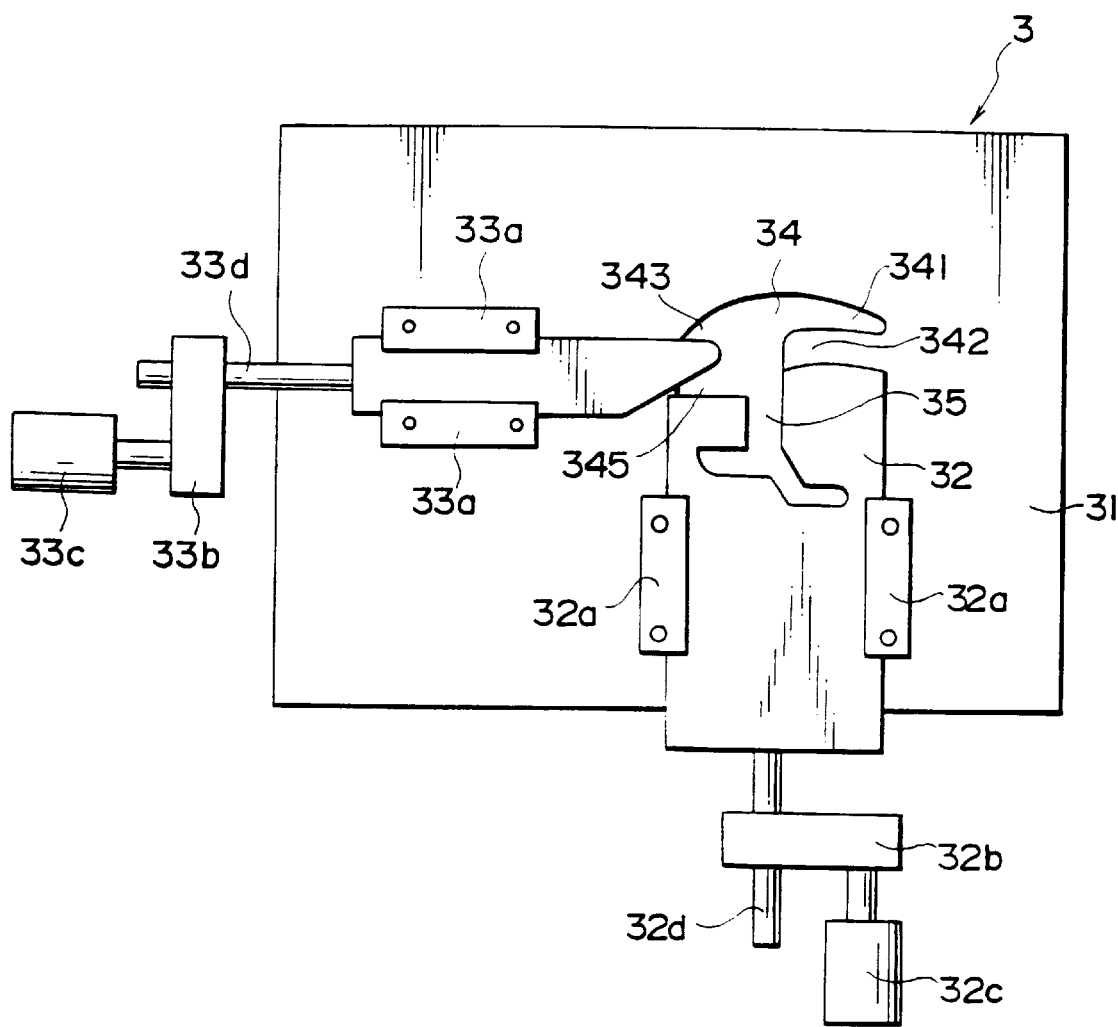
F I G. 31

FIG. 42
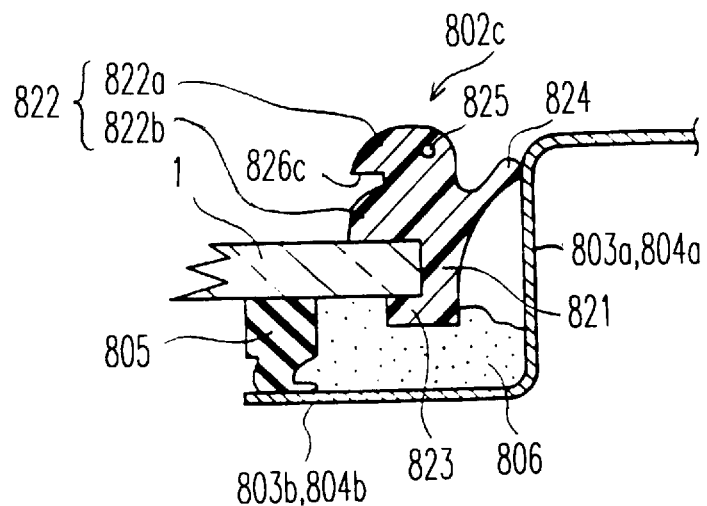
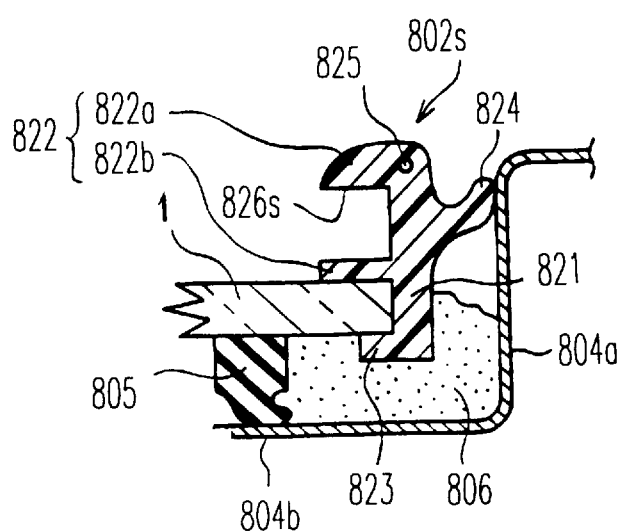
FIG. 43

AUTOMOBILE WINDSHIELD MOLDING AND THE METHOD OF PRODUCING THE SAME

RELATED APPLICATIONS

The present application is a Continuation of application Ser. No. 08/579,806, filed Dec. 28, 1995 now abandoned which is a continuation-in-part application of Ser. No. 08/475,618 filed Jun. 7, 1995, now U.S. Pat. No. 5,567,449, which is a divisional application of application Ser. No. 08/291,088 filed Aug. 18, 1994, now U.S. Pat. No. 5,474,729, which is a divisional application of application Ser. No. 08/192,623 filed Feb. 7, 1994 now U.S. Pat. No. 5,374,096, which is a continuation of application Ser. No. 07/781,371 filed Oct. 23, 1996, abandoned.

BACKGROUND OF THE INVENTION

1. Field of the Invention

This invention relates to an automobile windshield molding for a motor vehicle body to seal the space between a windshield and a periphery of a window opening of a vehicle body panel, and a method of producing such automobile windshield molding.

2. Description of the Related Art

An automobile windshield molding is usually attached around an edge of a windshield to seal the space between a windshield and a window opening of a vehicle body panel. The automobile windshield molding is directly attached to the vehicle body panel or is supported by a fastener fixedly mounted on the body panel.

Examples of such molding are disclosed in Japanese Utility Model Publication No. 54416/1982 and Japanese Utility Model Laid-Open Publication No. 9811/1989. These citations disclose windshield moldings which have water drain channels for receiving water flowing on the surface of the windshield.

Japanese Patent Laid-Open Publication 289427/1987 and Japanese Utility Model Laid-Open Publication No. 28374/1989 describe windshield moldings in which size of water drain channels is varied in the longitudinal direction of the molding.

In the latter two cases, the molding is divided into a portion without a water drain channel, a portion with a water drain channel of one size, and a portion with a water drain channel of a different size. These molding portions are separately produced, and are then arranged to be coupled as one unit by an injection molder. When they are coupled, there may be lines between joined areas of the molding parts, which would deteriorate decorativeness of the molding.

To overcome the foregoing inconvenience, a variety of proposals have been made in Japanese Patent Laid-Open Publications 8019/1988, 269612/1989, 195032/1989, 291721/1988, 244820/1989, 269611/1989, 269613/1989, and 283017/1987, and Japanese Utility Model Laid-Open Publication 128411/1989.

With Japanese Patent Laid-Open Publications 8019/1988 and 283017/1987, the molding has a specified constant cross-sectional shape in the longitudinal direction. The molding is deformed to serve an article at a portion where a water drain channel is to be formed.

In the citation 269612/1989, the molding has a specified constant cross-sectional shape in the longitudinal direction. The molding has a leg portion cut at one side, which are used to receive a windshield and to obtain a space for a water drain channel.

In 195032/1989, the molding has a specified constant cross-sectional shape, and a portion for a water drain channel is removed at portions where no water drain channel is necessary.

In 291721/1988 and 244820/1989, the molding has two extending portions to form a pair of grooves, and one of the extending portions is cut off at a portion where no water drain channel is necessary.

The citation 128411/1989 discloses a molding which is a modification of the moldings of the two last mentioned citations. In this citation, a corner joint is used to connect upper and side molding parts.

With 269611/1989 and 269613/1989, an upper decorative portion of the molding has a specified configuration, but the shape of a portion for receiving the windshield is changed.

In 269613/1989, the molding has a specified cross-sectional shape longitudinally, and the portion for receiving the windshield is changed in position by cutting to obtain a space for a water drain channel.

The foregoing moldings have drawbacks as described hereinafter.

The moldings of 8019/1988 and 269612/1989 have grooves for water drain channel, which are somewhat insufficient to guide water. In 195032/1989, the molding has a sharp edge on its decorative portion. Such sharp edge should be removed later. The depth of the groove in the side molding part cannot be changed serially. With 291721/1988 and 244820/1989, the depth of the grooves of the molding cannot be changed serially. The molding is difficult to attach in the windowshield of the automobile since a portion of the molding is cut off to serve as a water drain channel. With 244820/1989, a die should be modified to make a molding.

With the citations 269611/1989, 269913/1989, and 283017/1988, the depth of the grooves can be serially changed. However, at the upper molding part where no water drain channel is formed, portions of the molding in contact with the surface of the windshield should be housed inside the decorative portion. Therefore, the decorative portion should be made large, which would adversely affect the external appearance of the upper molding, and reduce the field of view from the driver's position. Such large upper molding part might be contrary to a demand for a flush surface between the windshield and the vehicle body panel. At the corner molding part, the molding might be wrinkled since the thin decorative portion is curved abruptly.

SUMMARY OF THE INVENTION

It is therefore an object of this invention to provide an automobile windshield molding, in which a water train channel is formed along the vehicle body side panel.

According to a first aspect of the present invention, there is provided an automobile windshield molding for sealing a space between a windshield and a periphery of a window opening of a vehicle body panel. The molding comprising an extruded side molding part and an extruded specific molding part integral with and extending from the side molding part. The side and specific molding parts comprising an exterior wing adapted to cover the space, on an exterior side of the vehicle.

The exterior wing comprising an inward wing portion having a uniform exterior contour appearance from the side molding part to the specific molding part; a sub-inward wing portion having an interior surface at the side molding part which continues in succession to an interior surface of the inward wing portion at the specific molding part; and a water drain channel extending in and along the inward wing portion and the sub-inward wing portion and opening inwardly at the side molding part.

At a specified point of the molding, the inward wing portion and the sub-inward wing portion close and merge toward each other such that the water drain channel is gradually reduced in size until the water drain channel is removed.

According to a second aspect of this invention, there is provided a method of producing a strip of an automobile windshield molding: extruding molding material through an opening formed by the dies to form a pair of side molding parts, a pair of corner molding parts and an upper molding part in succession; changing the position of each part in said opening by moving the dies according to the cross-sectional shape of side, corner and upper molding parts to be made; widening part of said opening of the dies to increase distance of each part of the molding material at a portion corresponding to the cross-sectional shape of a side molding part; projecting one of dies into the widened part of said opening of the dies at a specified timing to form a water drain channel on the large thickness portion of the side molding part, and reducing part of said opening of the dies to decrease distance of each part of the molding material and making said each parts of the molding in one body.

The windshield molding of this invention can be manufactured in the shape of strip. The water drain channel can be formed as desired according to a position of each molding part. The molding having a good decorativity can be made as one unit without any cutting process.

BRIEF DESCRIPTION OF THE DRAWINGS

FIG. 3 is a cross sectional view taken along line 3—3 of FIG. 1;

FIG. 4 is a cross sectional view taken along line 4—4 of FIG. 3;

FIG. 5 is a cross-sectional view taken along line 5—5 of FIG. 3;

FIG. 6 is a cross-sectional view taken along line 6—6 of FIG. 3;

FIG. 15 is a cross-sectional view of the molding of FIG. 14;

FIG. 16 is a cross-sectional view taken along line 16—16 of FIG. 15;

FIG. 17 is a cross-sectional view taken along line 17—17 of FIG. 15;

FIG. 22 is an enlarged sectional view showing a windshield molding according to a fourth embodiment;

FIG. 23 is a cross-sectional view taken along line 23—23 of FIG. 22;

FIG. 24 is a cross-sectional view taken along line 24—24 of FIG. 22;

FIG. 31 is a front elevational view showing the operation of the molding machine of FIG. 30;

FIG. 42, is a cross-sectional view taken along line 42—42 of FIG. 41;

FIG. 43 is a cross-sectional view taken along line 43—43 of FIG. 41;

DETAILED DESCRIPTION

An automobile windshield molding according to a first embodiment of the invention is shown in FIGS. 1 to 6.

Figure 1:
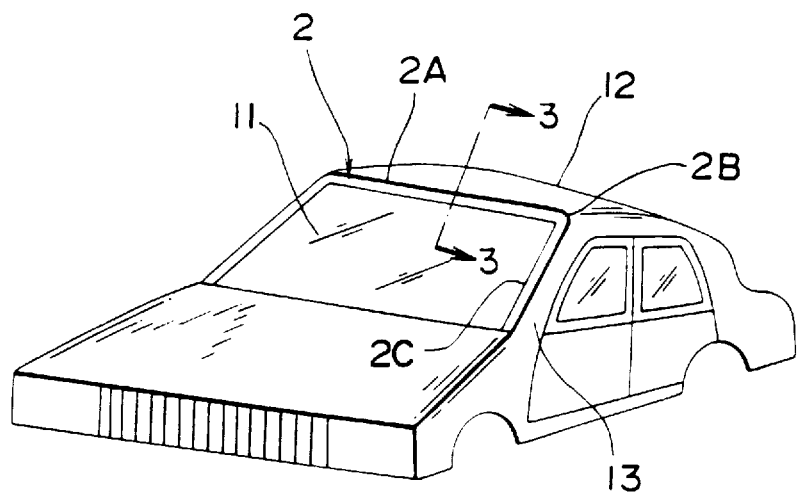
FIG. 1 is a front perspective view of a vehicle body having a windshield molding.

As shown in FIG. 1, a molding 2 is installed to seal the space between a windshield 11 and a periphery of a window opening of a vehicle body panel.

The molding 2 is a long plastic strip in the shape of T, and an upper molding part 2A to be mounted between the upper edge of the windshield and the roof panel 12, side molding parts 2C between side edges of the windshield 11 and pillar panels 13 of the vehicle body, and corner molding parts 2B for connecting the upper and side molding parts 2A and 2B. All of these molding parts 2A to 2C are extruded as one unit.

Each of the side, corner and upper molding parts 2A to 2C comprises an exterior wing 21 adapted to cover a space, on the exterior side of the vehicle, between the window-opening periphery of the vehicle body panel and each of side, corner and upper edges of the windshield.

The exterior wing 21 includes an inward wing portion 21a for covering the peripheral edge of the windshield 11, an outward wing portion 21b for covering the periphery of the vehicle body panels 12, 13, and a connecting portion 22 extending from an interior side of the exterior wing 21.

The outward wing portion 21b is a lip-shaped member having a uniform thickness in its longitudinal direction. The inward wing portion 21a is a lip-shaped member, being uniformly thick on the upper molding part 2A, but being thickened gradually from the corner molding part 2B to the side molding part 2C. Specifically, the inward wing portion 21a is thickest at the central portion of the side molding part 2C. Then the inward wing portion 21a is made gradually thin toward the end of the side molding part 2C. The windshield 11 is received in a U-shaped space between the inward wing portion 21a and a foot 24 of the connecting portion 22 from the upper molding part 2A to the corner molding part 2B.

Figure 2:
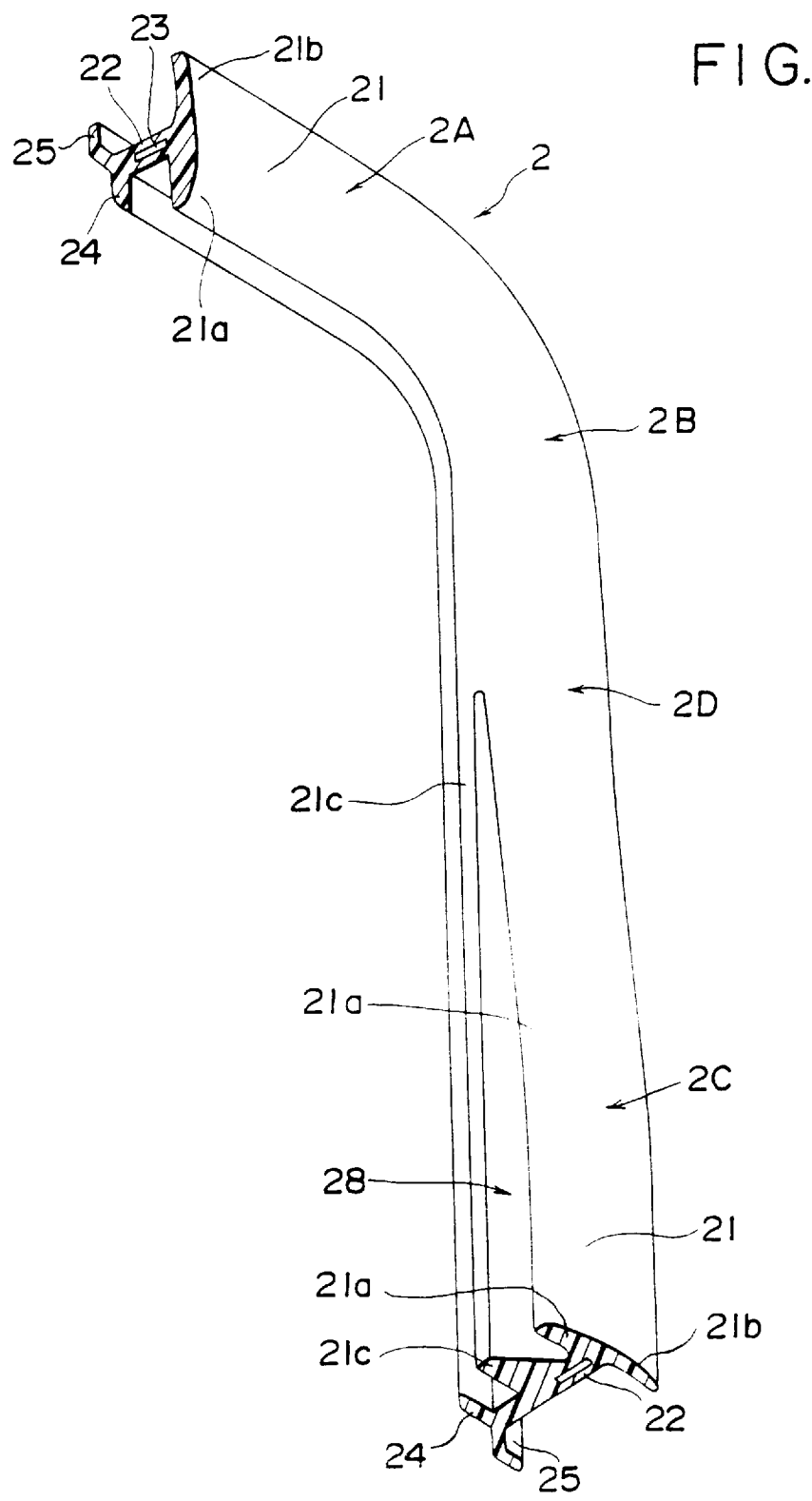
FIG. 2 is a perspective view of a windshield molding according a first embodiment of the invention.

The connecting portion 22 has the foot 24 extending inwardly along the end thereof as shown in FIG. 2. The foot 24 serves to assist in supporting the windshield 11. The connecting portion 22 also has a flexible lip 25 extends outwardly along the end thereof.

The connecting portion 22 divides the interior side of the exterior wing into inward and outward surfaces. There is a varying difference in height between the inward and outward surfaces. The connecting portion 22 is short on the upper molding part 2A (shown in FIG. 3), and gradually becomes longer on the side molding parts 2C (shown in FIGS. 4 to 6), because the distance between the surface of the windshield 11 and the surface of he front pillars 13 is increased compared with the distance between the surface of the windshield 11 and the surface of the roof panel. Specifically, the connecting portion 22 is made gradually longer from the corner molding part 2B toward the central portion of the side molding part 2C, and is again made a little shorter at the end of the side molding part 2C.

A thin metallic foil 23 serving as a core metal is embedded lengthwise in the connecting portion 22 near the junction with the exterior wing 21.

At the majority of the side molding part 2C, the windshield 11 is received in the space formed between the foot 24 of the connecting portion 22 and a sub-inward wing portion 21c which is formed as the connecting portion 22 gradually becomes longer. A water drain channel 28 is formed between the inward wing portion 21a and the sub-inward wing portion 21c (FIG. 2). The upper surface of the foot 24 and the interior side of the inward wing portion 21a are aligned in height with each other at the upper and corner molding parts. The upper surface of the foot 24 and the interior side of the sub-inward wing portion 21c are aligned in height with each other at the side molding parts. In other words, the distance between the foot 24 and the inward wing portion 21a (or the sub-inward wing portion 21c at the side molding parts) is equal to the thickness of the windshield 11.

The inward and outward wing portions 21a, 21b have a uniform exterior contour appearance through the entire molding and the sub-inward wing portion 21c has a uniform interior surface through the side molding parts 2C. The interior surface of the sub-inward wing portion 21c continues in succession from the side molding parts 2C to the interior surface of said inward wing portion 21a of the corner molding part 2B and the upper molding part 2A. The interior surface of the inward wing portion 21a breaks between the side molding parts 2C and the upper molding part 2A. However, the inward wing portion 21a and the sub-inward wing portion 21c are gradually separated from each other between the corner molding part and the side molding part since the connecting portion 22 becomes longer and the water drain channel 28 is gradually widened and deepened according to a difference H of height of the upper surface of the windshield 11 and height of the roof panel 12. On the upper molding part 2A, the surface of the roof panel 12 and the upper surface of the windshield 11 is flush as shown in FIG. 3. FIG. 4 shows that there is the height difference $H_1$ between the roof panel 12 and the windshield 11 at the beginning of the side molding part 2C. FIG. 5 shows that there is the largest height difference $H_2$ on the center of the side molding part 2C. The distance between the inward wing portion 21a and the sub-inward wing portion 21c is largest on the central side molding part 2C, and is formed with a water drain channel 28. Then the distance between the inward wing portion 21a and the sub-inward wing portion 21c is gradually reduced toward the end of the side molding part 2C. The connecting portion 22 is also changed in its length according to the distance between the inward wing portion 21a and the sub-inward wing portion 21c.

The water drain channel 28 is defined between the inward wing portion 21a and the sub-inward wing portion 21c of each side molding part 2C. The water drain channel 28 has a triangular cross section and gradually changes its size. The drain channel 28 is located between the end 2D of the corner molding part 2B and the end of the side molding part 2C. Therefore, the inward wing portion 21a and the sub-inward wing portion 21c keeps their uniform shapes throughout the entire molding by adjusting the depth and width of the water drain channel 28 at the side molding parts 2C. At the end of the side molding part 2C, the inward wing portion 21a and the sub-inward wing portion 21c come near each other, finally merging. Then the water drain channel 28 disappears completely. The thickness of the merging body is gradually thinned toward the upper molding part 2A such that the exterior contour appearance of the merging body converge to that of the upper molding part 2A. The exterior contour appearance of the upper molding part 2A is the same as the inward wing portion 21a at the side molding part 2C.

The molding 2 will be attached to the windshield 11 and the vehicle body as described below.

FIGS. 3 to 6 show the manner in which the molding 2 is attached between the corner and the side edges of the windshield 11.

A window opening of the roof panel 12 has a slanted wall 12a and a flange 13b for receiving the windshield 11. The front pillar 13 also has a slanted wall 13a and the flange 13b for receiving the windshield 11. The slanted wall 13a has a height increased gradually from the corner to the side of the vehicle body panel compared with the slanted wall 12a.

Firstly, the molding 2 is attached around the peripheral edge of the windshield 11. Between the upper and corner parts, the edge of the windshield 11 is sandwiched between the foot 24 and the interior side of the inward wing portion 21a. At the side molding parts 2C, each of the side edges of the windshield 11 is sandwiched between the foot 24 and the interior side of the wall 21c. Since the inward wing portion 21a and the sub-inward wing portion 21c are relatively thin at the corner molding part 2B, the molding 2 is curved without wrinkles according to the shape of the corner part of the window opening of the vehicle body panel.

A dam rubber 14 in strip shape is applied around the edges of the flanges 12b and 13b. An adhesive 15 is applied to the outer edge of the dam rubber 14. Then the windshield 11 having the molding 2 mounted therearound is placed on the dam rubber 14. The windshield 11 is then pressed toward the vehicle body, so that the outward wing portion 21b of the molding 2 overlies the body panels 12, 13. Therefore, the foot 24 of the molding 2 is fastened by the adhesive 15, and the flexible lip 25 of the molding 2 is flexibly contacted to the slanted walls 12a, 13b, thereby fastening the windshield 11 to the body panel.

The difference of the height between the outer surface of the body panel and the windshield 11 is equal to the difference of height between the slanted walls 12a and 13a as shown in FIGS. 3 to 6. As shown in FIG. 3, the upper edge of the windshield 11 is nearly flush with the surface of the roof panel 12. The height difference HI is small between the windshield 11 and the corner part of the front pillar 13 (shown in FIG. 4), while the difference $H_2$ is large at the central side edges of the windshield 11 (shown in FIG. 5). The difference $H_3$ between the end of the side molding part and the front pillar 13 is larger than $H_1$ but smaller than $H_2$ (shown in FIG. 6).

It is understood that the distance between the inward wing portion 21a and the sub-inward wing portion 21c of the molding 2 is changed according to the varying difference of the height between the windshield 11 and the body panel, and that the depth and width of the water drain channel 28 varies accordingly.

The edge of the outward wing portion 21b of the molding 2 is in close contact with the roof panel 12 between the upper and corner parts of the windshield 11. From the upper to corner molding parts, the inward wing portion 21a slightly extends upwardly, i.e. as shown in FIG. 4, the sub-inward wing portion 21c is being formed under the inward wing portion 21a. Therefore water is guided on the surface of the windshield along the wall of the inward wing portion 21a.

Since the inward wing portion 21a accompanies the sub-inward wing portion 21c at the corner molding parts, the exterior wing 21 is free from wrinkles even if it is bent along the corner portions.

The molding 2 can be installed in the window opening of the vehicle after the windshield 11 has been attached thereto. Otherwise, the molding can be inserted into the space between the window opening and the windshield 11 attached therein.

Figure 7:
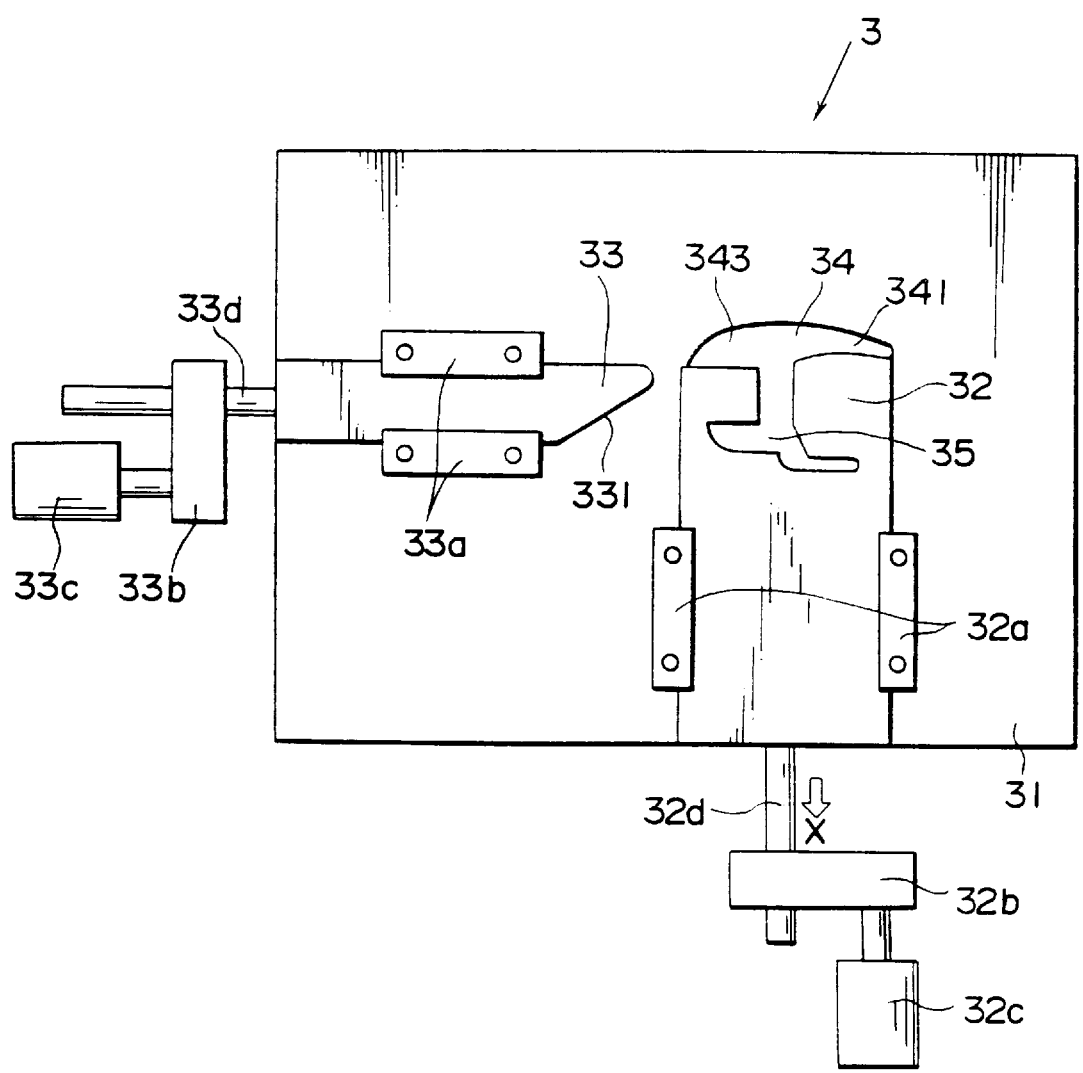
FIG. 7 is a front elevational view of an injection molding machine for making the molding of FIGS. 1 to 6.

A molding machine for producing the molding 2 will be described with reference to FIGS. 7 and 8.

A molding machine 3 comprises three dies having openings through which the plastic material is extruded. These dies are first, second and third dies 31, 32, 33 positioned in parallel to the direction for extruding the plastic material, i.e. in the direction perpendicular to the plane of FIG. 7 and 8.

The first die 31 is stationary, having an opening 34 shaped according to the cross-sectional shape in the shape of a vertically long rectangle of the molding 2. Specifically, the upper portion of the opening 34 corresponds to the cross-sectional shape of the exterior wing 21, and the lower portion of the opening 34 substantially corresponds to the cross-sectional shape of the connecting portion 22, foot 24 and flexible lip 25.

The opening 34 has an upper edge in the shape of an arc which defines portions 341 and 343 with the shield 342 corresponding to the shape of the upper side of the exterior wing 21, and a portion 345 corresponding to the shape of the sub-inward wing portion 21c. The lower edge of the portion 341 together with the shield 342 corresponds to the shape of the lower part of the outward wing portion 21b. The lower section of the portions 343 and 345 substantially correspond to the cross-sectional shape of the inward wing portion 21a and the sub-inward wing portion 21c. The inward wing portion 21a and the sub-inward wing portion 21c are in succession when the water drain channel 28 is not formed.

The second and third dies 32, 33 are rectangular plates, which are respectively supported by a pair of guides 32a and a pair of guides 33a to be movable in parallel to the front side of the first die 31.

The second die 32 has an opening 35 which corresponds to the cross-sectional shape of the connecting portion 22, foot 24 and the flexible lip 25. The second die 32 is placed on the first die 31 so that the openings 34, 35 of the first and second dies 31, 32 are in the shape of the molding 2. The second die 32 has at Its lower portion an operation ever 32d, which is connected to a motor 32c via a converter 32b for converting rotary motion of the motor 32c into rectilinear motion. When driven by the motor 32c, the second die 32 reciprocates between the positions for forming the upper and lower molding portions shown in FIGS. 7 and 8, respectively.

The third die 33 is a thin rectangular plate having a slanted edge 331 pointed with an acute angle, corresponding to the water drain channel 28 reciprocating in the direction perpendicular to the second die 32. The third die 33 is connected to a motor 33c via an operation lever 33d and a converter 33b for converting the rotary motion to the rectilinear motion. The third die 33 is guided into and out of the opening 34 of the first die 31 so that the slanted edge 331 advances into the areas 343 and 345 to form the water drain channel 28 between the inward wing portion 21a and the sub-inward wing portion 21c of the molding 2. The third die 33 reciprocates according to the movement of the second die 32.

In operation, the molding machine 3 produces the molding 2 as described hereinafter.

The molding 2 comprises a side molding part 2C, a corner molding part 2B, upper molding part 2A, a corner molding part 2B and a side molding part 2C formed in the named order in succession.

Figure 8:
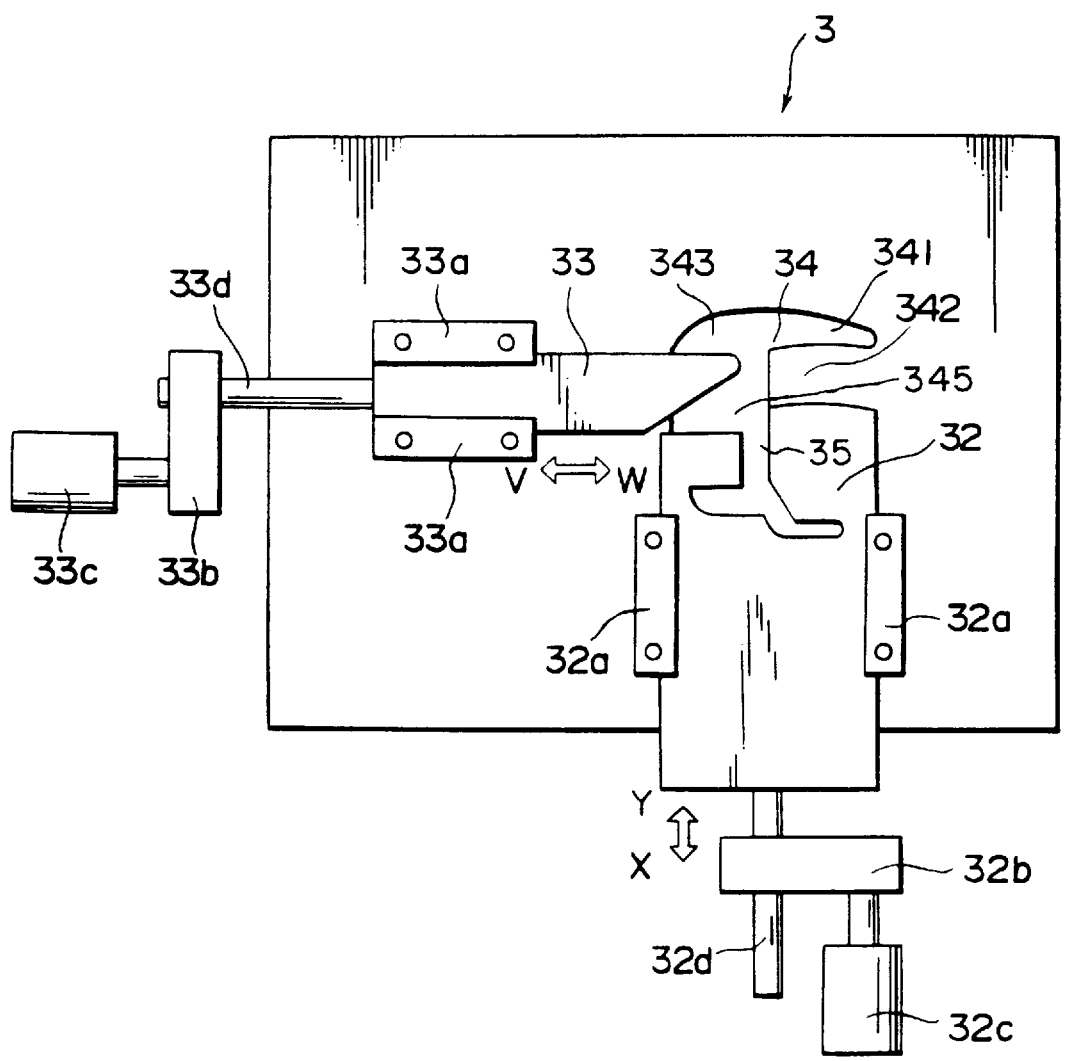
FIG. 8 shows how the molding machine operates.

Each of the side molding 2C and corner molding 2B will be extruded in order of 2C, 2B, 2A on one side and 2B, 2C on another side and shaped as described referring to FIG. 8. Firstly, the second die 32 is placed on the first die 31 so that the openings 34 and 35 of the first and second dies are in the cross-sectional shape of the side molding part 2C. The plastic material is extruded through the openings 34 and 35 together with a metallic foil strip 23 inserted at a position corresponding to the connecting portion 22 of the opening 34. In this case, the second die 32 is somewhat raised in the direction shown by an arrow Y, and the third die 33 is somewhat retracted in the direction shown by an arrow V.

The plastic material is extruded to a preset extent under this condition. Then the second die 32 is lowered in the direction X. The portions 343, 345 of the opening 34 of the first die 31 are gradually widened to increase the space which forms a groove. Then sub-inward wing portion 21c will be formed under the groove. The other portions of the side molding part 2C are being shaped without any change.

The third die 33 is advanced in the direction W as the space between the inward wing portion 21a and the sub-inward wing portion 21c becomes larger to form the groove therein. Thus the third die 33 forms the groove as the water drain channel 28 between the inward wing portion 21a and the sub-inward wing portion 21c. Since the third die 33 is moved In synchronization with the moving speed of the second die 32, the depth and the width of the opening of the drain channel 28 are increased but the exterior contour appearance of the inward wing portion 21a and the sub-inward wing portion 21c respectively are the same through the entire molding. Under the condition shown in FIG. 8, the distance between the inward wing portion 21a and the sub-inward wing portion 21c is largest, and the water drain channel 28 is the widest and deepest to the preset length of the side molding part 2C.

When the side molding part 2C is extruded to the specified length and a corner molding part 2B is to be formed, the second die 32 is raised again in the direction Y and the third die 33 is retracted to the direction V. Then, the distance between the portions 343 and 345 are reduced, thus the distance between the inward wing portion 21a and the sub-inward wing portion 21c are reduced and the size of the water drain channel 28 is reduced. Under this condition, the inward wing portion 21a and the sub-inward wing portion 21c remain uniform in thickness through the entire molding 2. The other portions of the side molding part remain unchanged.

When the third die 33 is retracted completely from the portions 343, 345 of the opening 34, the second die 32 is moved in the direction Y until the top of the second die 32 is flush with the edge of the shield 342 of the first die 31. Under this condition, the molding extruded from the opening 34 is shaped so that the distance between the inward wing portion 21a and the sub-inward wing portion 21c is gradually reduced. When the portions 21a and 21c merge, the water drain channel 28 disappears. After that, the corner molding part 2B is extruded while the top of the shield 342 of the first die 31 and the upper edge of the second die 32 are closed with each other. After that, the shape of the openings 34 and 35 matched together corresponds to the cross-sectional shape of the upper molding part 2A. Under this condition, the motors are stopped, and the plastic material is extruded through the openings 34 and 35 for a predetermined period of time to produce the upper molding part 2A.

When the upper molding part 2A becomes long as specified, the motor 32c is driven again to produce the corner molding part 2B and the side molding part 2C on another side in the order named. Thus the molding 2 is produced in the shape of a strip.

A second embodiment of the invention will be described referring to FIGS. 9 to 12.

Figure 9:
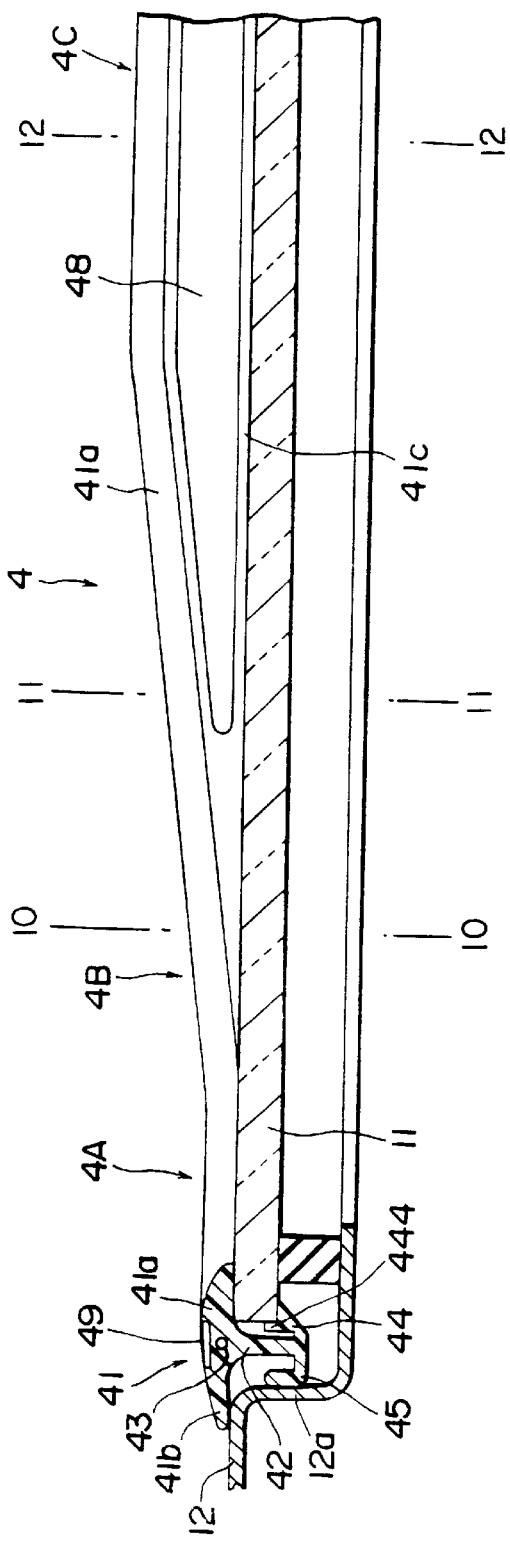
FIG. 9 is a front elevational view of a molding according to a second embodiment of the invention.

FIG. 9 is a cross-sectional view showing a windshield molding 4 according to the second embodiment. The molding 4 comprises a pair of extruded side molding parts 4C, a pair of extruded corner molding parts 4B, and an extruded upper molding part 4A integral and extending between the side and corner molding parts.

Each of the molding parts 4A, 4B and 4C includes an exterior wing 41 and a connecting portion 42. The exterior wing 41 has an inward wing portion 41a and an outward wing portion 41b. The outward wing portion 41b has a uniform shape and thickness throughout the molding parts 4A to 4C.

The connecting portion 42 has a foot 44 extending inwardly along the lower end thereof. The foot 44 has a forked portion 444 at its end. One of the forked portion 444 contacts with the lower side of the windshield 11, and another of the forked portion 444 contacts with the side of the windshield 11. Namely, the forked portion 444 contacts with an interior edge of the windshield 11. A flexible lip 45 extends outwardly along the lower end of the connecting portion 42. A wire 43 serving as a core material is embedded along the joint between the connecting portion 42 and the exterior wing 41 of the molding 4.

A decorative metal film 49 is embedded along the central portion of the exterior wing 41 of the molding 4, i.e. along the border between the inward wing portion 41a and the outward wing portion 41b. The outward wing portion 41b has a uniform thickness throughout the molding 4.

The distance between the inward wing portion 41a and the sub-inward wing portion 41c of the molding 4 is changed according to the varying difference of height between the body panels 12, 13 and the windshield 11. The depth and width of a water drain channel 48 are varied with the distance between the inward wing portion 41a and the sub-inward wing portion 41c.

Figure 10:
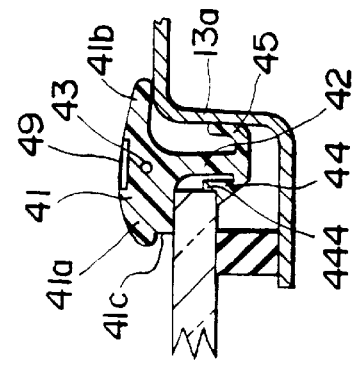
FIG. 10 is a cross-sectional view taken along line 10—10 of FIG. 9.

FIG. 10 shows that the inward wing portion 41a and the sub-inward wing portion 41c are close each other at the beginning of the side molding part 4C, since the difference of height between the upper surface of the windshield 11 and the vehicle body panel is small.

Figure 11:
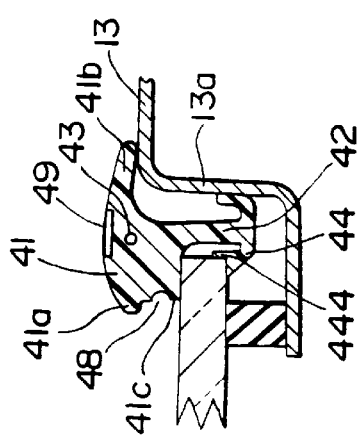
FIG. 11 is a cross-sectional view taken along 11—11 of FIG. 9.

FIG. 11 is a cross-sectional view taken along line VI—VI of FIG. 9, showing that a water drain channel 48 is very small.

Figure 12:
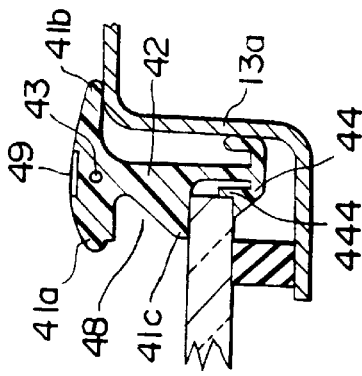
FIG. 12 is a cross-sectional view taken along 12—12 of FIG. 9.

As shown in FIG. 12, the water drain channel 48 is widest and deepest where the distance between the inward wing portion 41a and the sub-inward wing portion is largest. The water drain channel 48 is triangular in its cross section. The inward wing portion 41a and the sub-inward wing portion 41c are uniformly thick throughout the side molding part 4C.

The depth and width of the water drain channel 48 depends upon the distance between the inward wing portion 41a and the sub-inward wing portion 41c.

The molding 4 of the second embodiment is as effective as the molding of the first embodiment.

Figure 13:
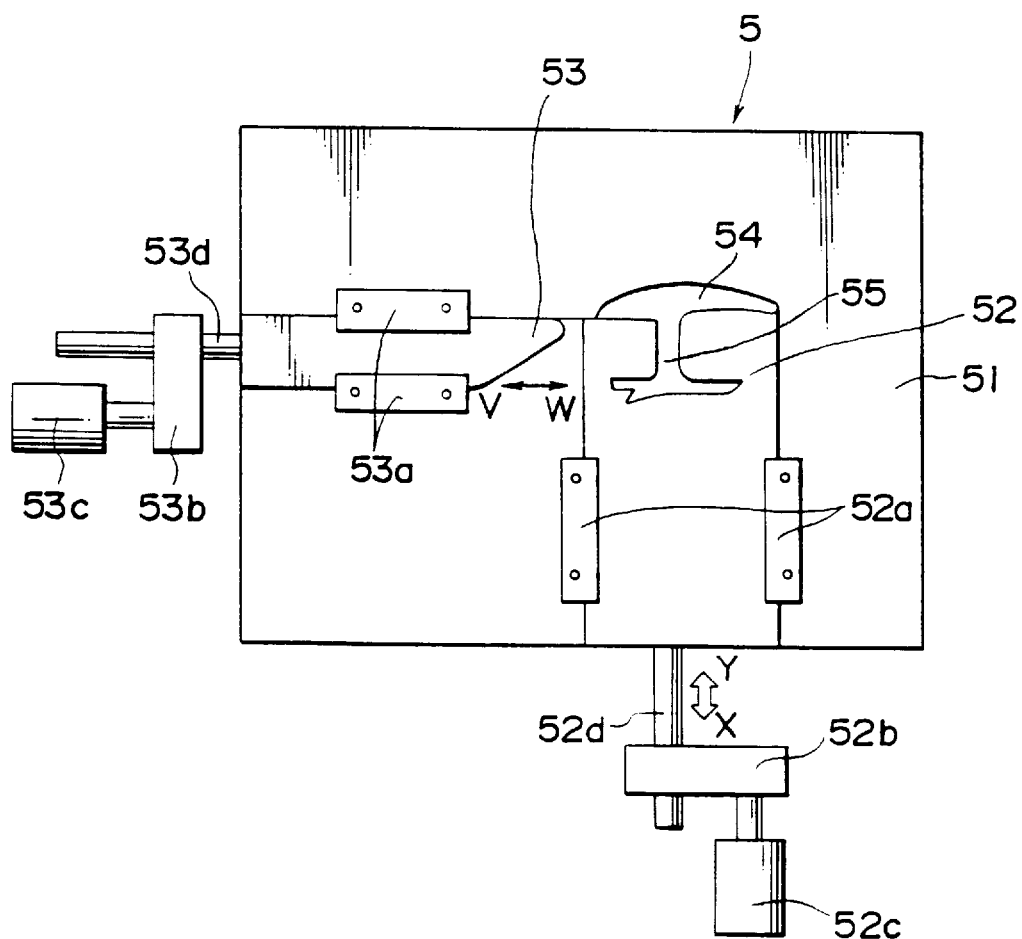
FIG. 13 is a front elevational view of an injection molding machine for making the molding of FIGS. 9 to 12.

A molding machine for producing the molding 4 will be described with reference to FIG. 13.

A molding machine 5 comprises three dies having openings through which the plastic material is extruded. These dies are first, second and third dies 51, 52, 53 positioned in parallel to the direction for extruding the plastic material, i.e. in the direction perpendicular to the plane of FIG. 13.

The first die 51 is stationary, having an opening 54 shaped in the shape of a vertically long rectangle according to the cross-sectional shape of the molding 4. Specifically, the upper portion of the opening 54 corresponds to the cross-sectional shape of the exterior wing 41, and the lower portion of the opening 54 substantially corresponds to the cross-sectional shape of the connecting portion 42, foot 44 and flexible lip 45.

The second and third dies 52, 53 are rectangular plates, which are respectively supported by a pair of guides 52a and a pair of guides 53a to be movable in parallel to the front side of the first die 51.

The second die 52 has an opening 55 which corresponds to the cross-sectional shape of the connecting portion 42, foot 44 and the flexible lip 45. The second die 52 is placed on the first die 51 so that the openings 54, 55 of the first and second dies 51, 52 are n the shape of the molding 4. The second die 52 has at its lower portion an operation lever 52d, which is connected to a motor 52c via a converter 52b for converting rotary motion of the motor 52c into rectilinear motion. When driven by the motor 52c, the second die 52 reciprocates between the positions for forming the upper and lower molding portions.

The third die 53 is a thin rectangular plate having a slanted edge corresponding to the water drain channel 48, reciprocating in the direction perpendicular to the second die 52. The third die 53 is connected to a motor 53c via an operation lever 53d and a converter 53b for converting the rotary motion to the rectilinear motion. The third die 53 is guided into and out of the opening 54 of the first die 51 so that the slanted edge advances into the opening 54 of the first die 51. The third die 53 reciprocates according to the movement of the second die 52.

In operation, the molding machine 5 produces the molding 4 by moving the two dies 52, 53 as described with reference to the first embodiment.

Figure 14:
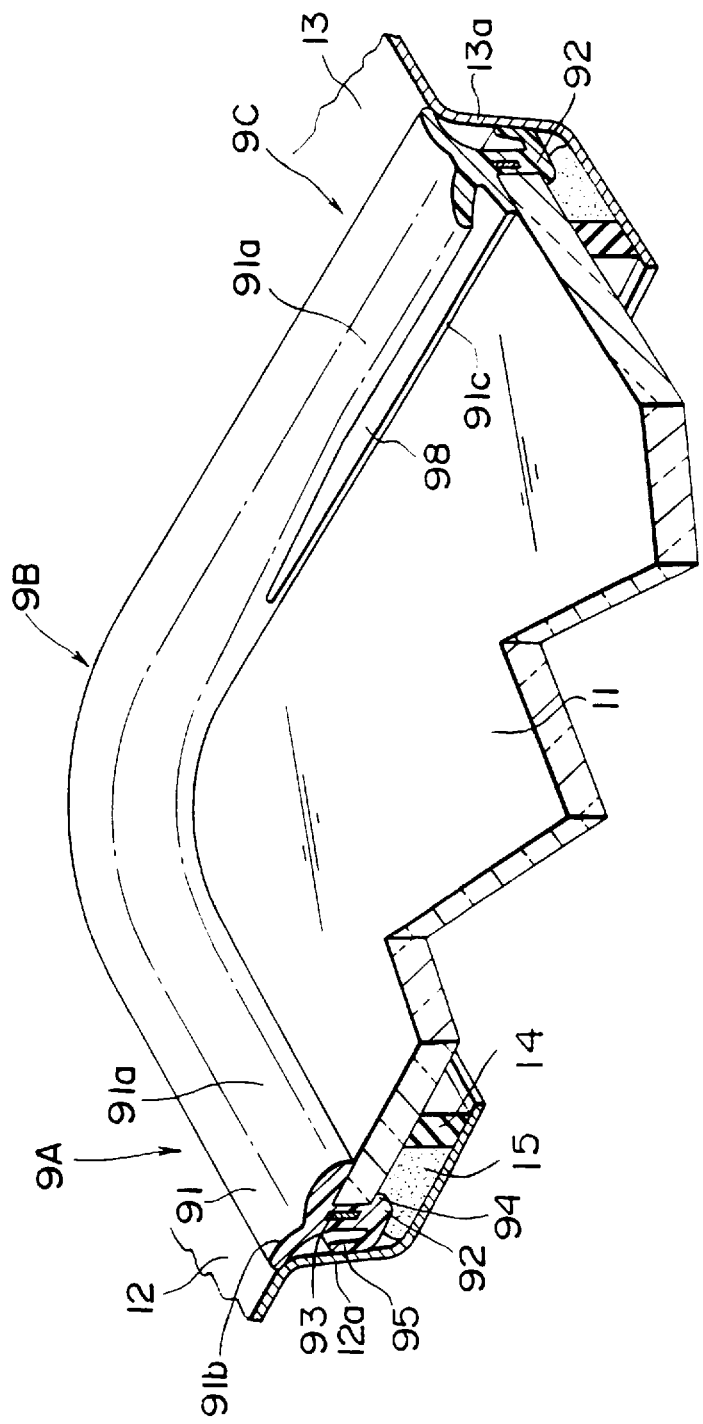
FIG. 14 is a partial cross-sectional view of a corner portion of a windshield molding according to a third embodiment of the invention.

FIGS. 14 to 17 show a third embodiment of the invention. As shown in FIG. 14, a molding 9 comprises a pair of extruded side molding parts 9C, a pair of extruded corner molding parts 9B, and an extruded upper molding part 9A integral with and extending between the side and corner molding parts.

Each of the molding parts 9A, 9B and 9C includes an exterior wing 91 and a connecting portion 92. The exterior wing 91 has an inward wing portion 91a and an outward wing portion 91b.

As shown in FIG. 14, the connecting portion 92 includes a foot 94 extending inwardly along the lower end thereof. At the upper molding part 9A, the upper edge of the windshield 11 is received in the space formed by the foot 94 and the inward wing portion 91a. At the majority of the side molding part 9C, the inward wing portion 91a is gradually projected to the exterior direction to form a sub-inward wing portion 91c thereunder. A water drain channel 98 is formed between the inward wing portion 91a and the sub-inward wing portion 91c. Therefore, the edge of the windshield 11 is received in the U-shaped space between the foot 94 and the sub-inward wing portion 91c. The U-shaped space for receiving the windshield 11 is uniform in the shape throughout the whole molding parts.

The connecting portion 92 has a flexible lip 95 extending from the lower end thereof toward the vehicle body panels 12, 13 throughout the molding parts. The flexible lip 95 is bent in the L-shape to contact with the slanted walls 12a, 13a. A core metal 93 is longitudinally embedded at the joint between the exterior wing 91 and the connecting portion 92.

In this embodiment, the body panels 12, 13 are in equal in height, having the uniform cross-sectional shape. The molding 9 has the uniform cross-sectional shape except for the side molding part 9C where the inward wing portion 91a is gradually bulged to form the sub-inward wing portion 91c thereunder.

Near the end of the side molding part as shown in FIG. 17, the distance between the inward wing portion 91a and the sub-inward wing portion 91c is largest. The water drain channel 98 having a triangular cross-sectional shape is widest and deepest between the inward wing portion 91a and the sub-inward wing portion 91c.

Toward the upper region of the side molding part 9C, the water drain channel 98 gradually becomes smaller in the depth and width as shown in FIG. 16. Therefore, the distance between the inward wing portion 91a and the sub-inward wing portion 91c also becomes smaller. Near the corner molding part 9B, the water drain channel 98 disappears completely, thereby making the inward wing portion 91a and the sub-inward wing portion 91c close each other. No water drain channel is formed on the upper molding part 9A.

The molding 9 thus formed can function as effectively as the molding of the first embodiment.

Figure 18:
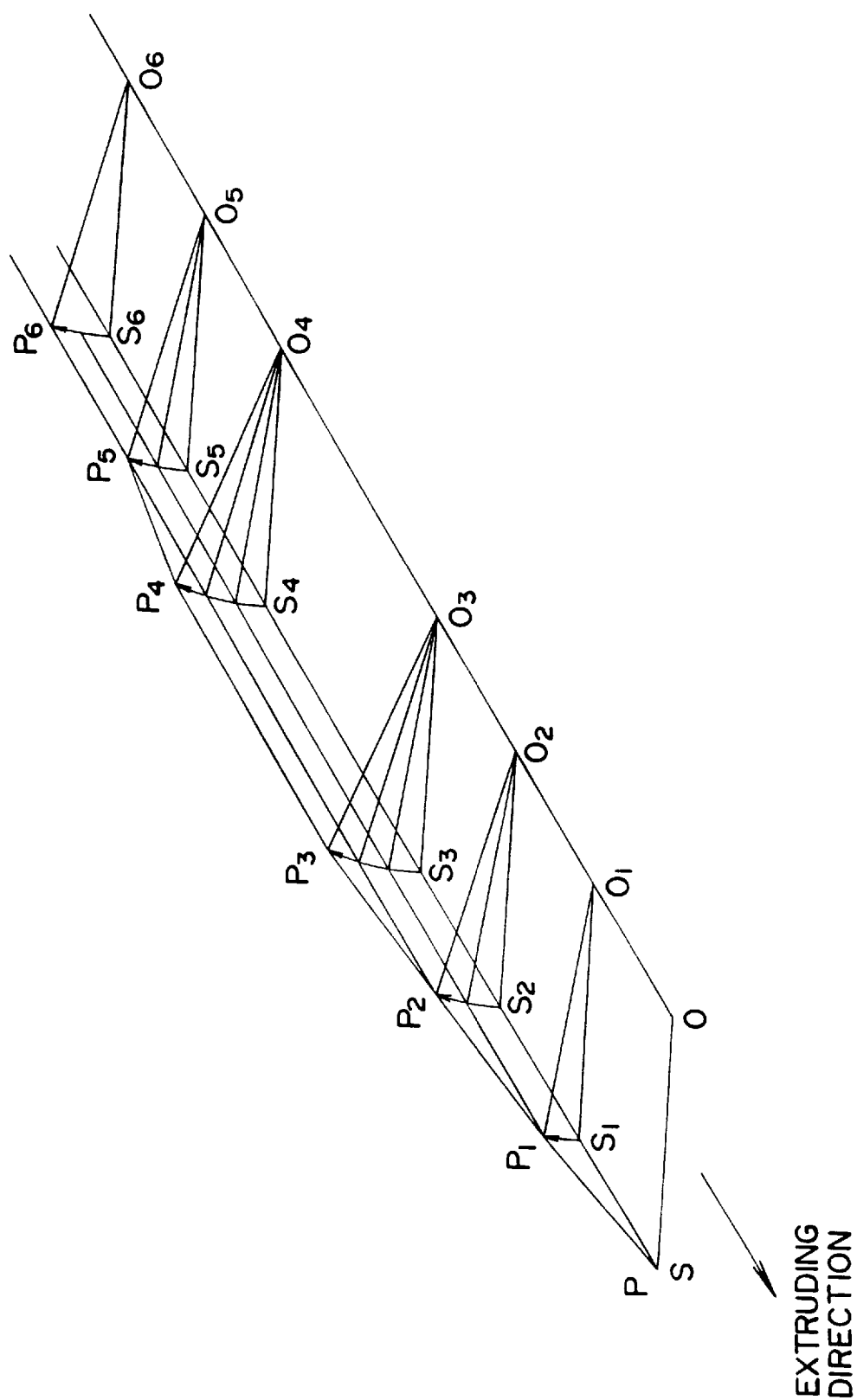
FIG. 18 is a schematic perspective view showing the surface of a side molding part.

The inward wing portion 91a gradually bulges at the majority of the side molding parts 9C. As shown in FIG. 14, the inward wing portion 91a bulges as if it rotates with a radius OP. The edge of the inward wing portion 91a is contoured as shown by $O_1P_1, O_2P_2, \ldots, O_5P_5, O_6P_6$, in FIG. 18.

In FIGS. 14 to 17, the reference numeral 15 stands for a sealant for adhering the molding 9 and the windshield 11 to the body panels 12, 13, and 14 represents a dam rubber for preventing the sealant 15 from flowing.

The molding 9 will be attached to the wind opening of the vehicle as described with reference to the foregoing embodiments.

Figure 19:
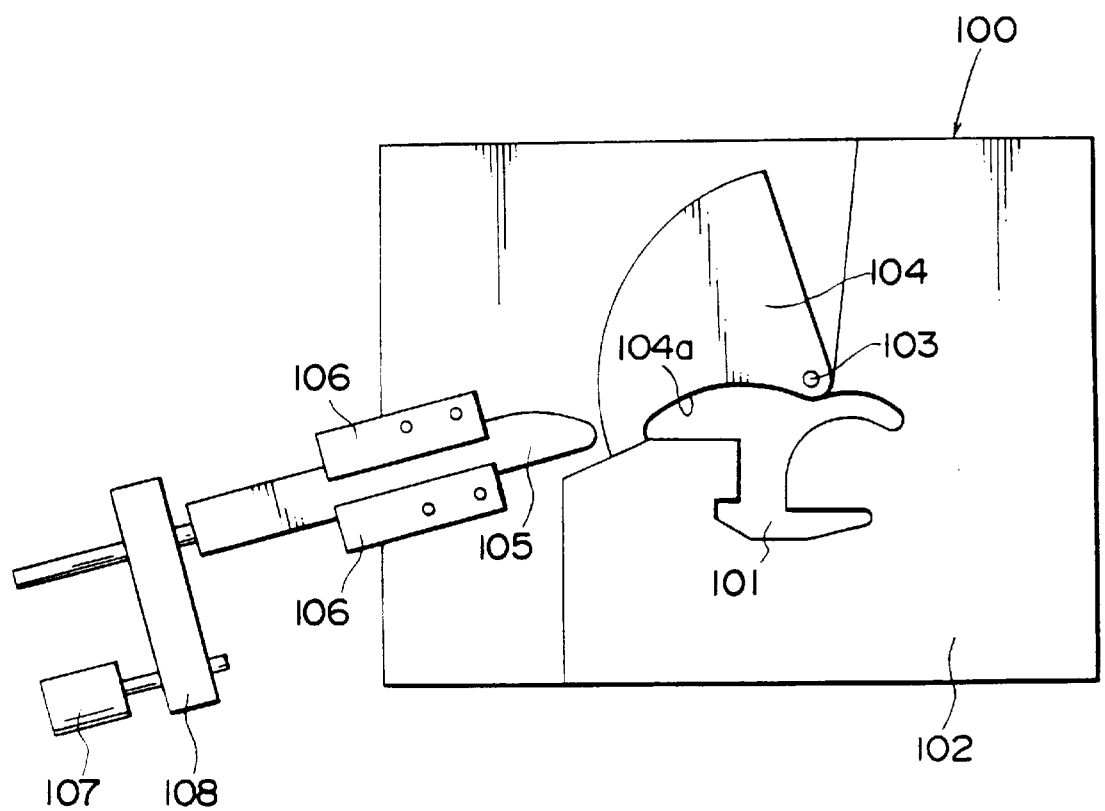
FIG. 19 is a front elevational view of an injection molding machine for making the molding of FIGS. 14 to 17.
Figure 20:
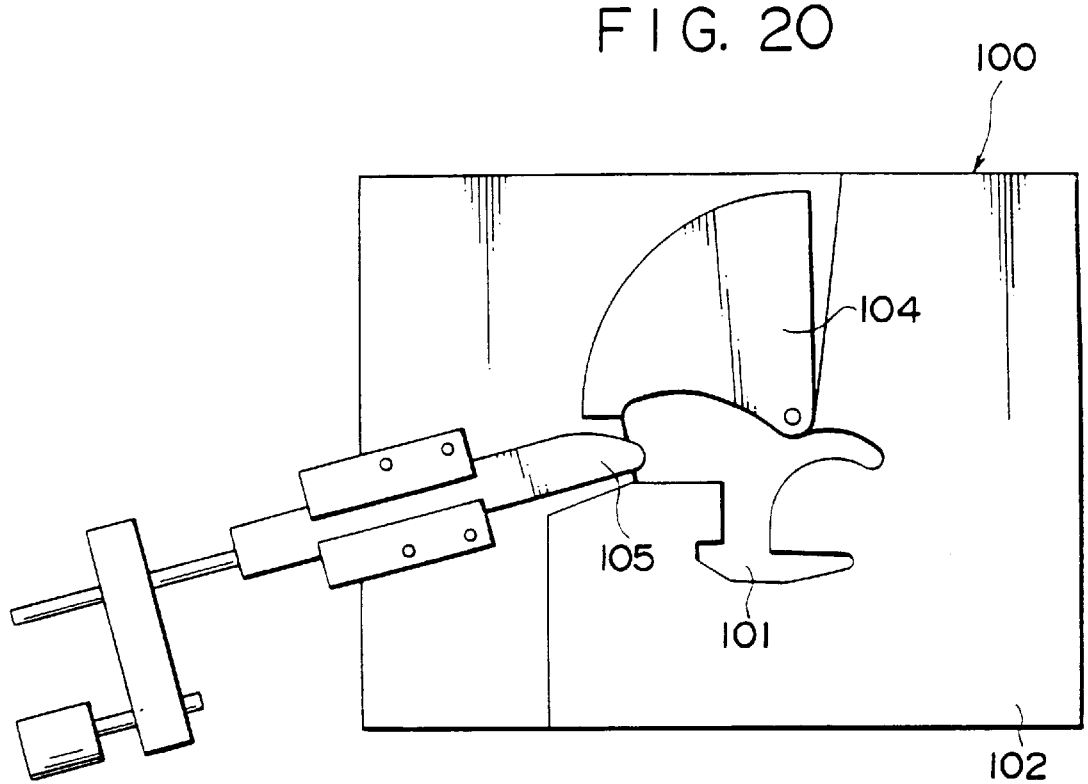
FIG. 20 is a front elevational view showing the operation of the molding machine of FIG. 19.
Figure 21:
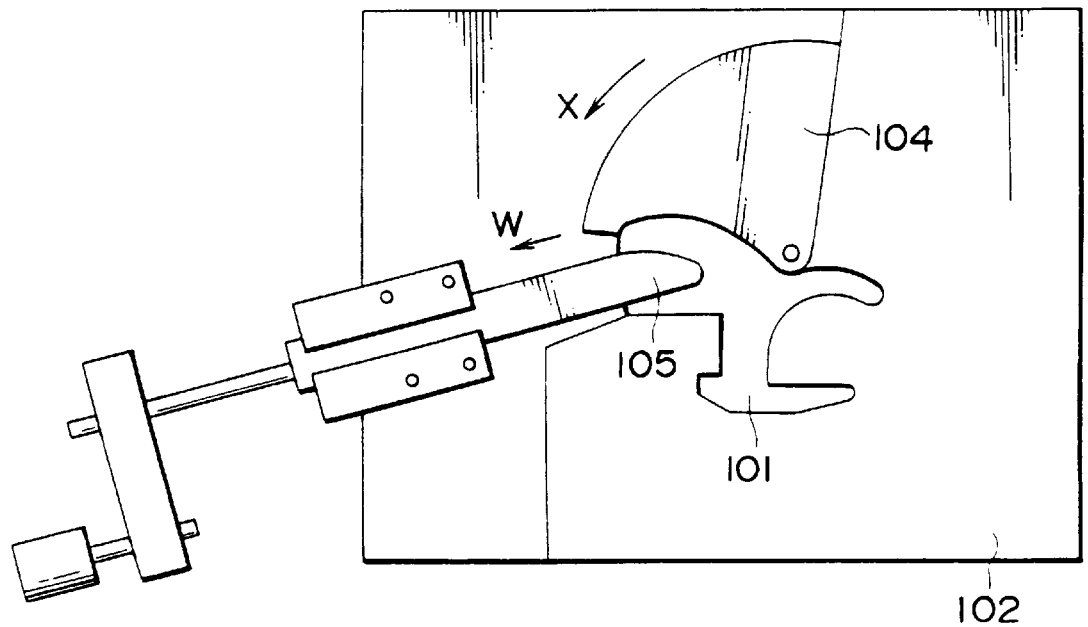
FIG. 21 is a view similar to FIG. 20 showing the operation of the molding machine of FIG. 19.
Figure 25:
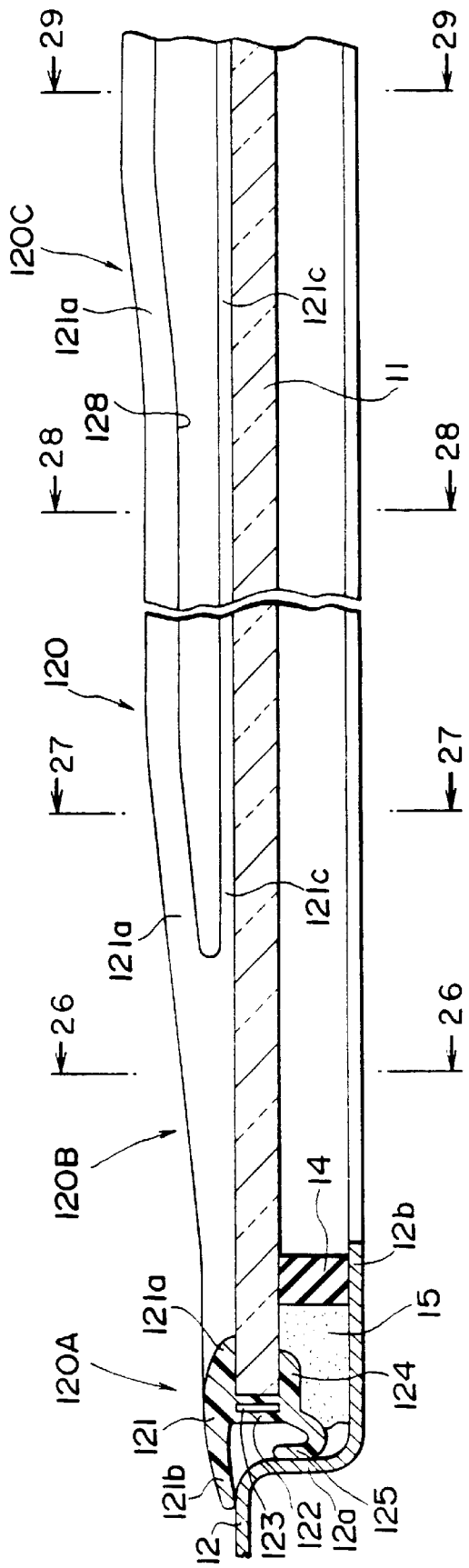
FIG. 25 is an enlarged sectional view showing a windshield molding according to a fifth embodiment.

A molding machine for producing the molding 9 will be described with reference to FIGS. 19 to 21. The molding machine 100 comprises first to third dies 102, 104, 105 which are positioned in parallel to the direction (perpendicular to the plane of FIG. 19) in which the molding 9 is extruded, forming an opening through which plastic material is to be extruded. The first die 102 is stationary, having an opening 101 which is shaped according to the cross-sectional shape of the molding 9. The shape of the opening 101 is changed as shown in FIGS. 19 to 21 form the inward wing portion 91a and the sub-inward wing portion 91c and the water drain channel 98 at the side molding part 9C.

The second and third dies 104, 105 are made of plate members, and are supported to be movable on the front surface of the first die 102. The second die 104 is in the shape of a sector, being positioned over the opening 101. A side 104a of the sector-shaped second die 104 is shaped according to the upper contour of the inward wing portion 91a. The second die 104 is rotatable centrally of the fulcrum 103. The fulcrum 103 is located above a position corresponding to the boundary between the inward and outward wind portions 91a, 91b of the molding 9. The second die 104 is operated to change the shape of the opening 101 according to the size of the water drain channel 98.

The third die 105 is guided by a pair of guides 106 to be rectilinearly movable. The third die 105 is connected to a motor 107 via an operating lever 109 and a converter 108. The rotary motion of the motor 107 is converted into the rectilinear motion by the converter 108. Therefore the third die 105 moves rectilinearly, advancing and retracting into and from the opening 101 at portions for forming the upper, corner and side molding parts as shown in FIGS. 19 to 21.

The third die 105 has a slanted edge corresponding to the water drain channel 98, which is movable into the opening 101 corresponding of the shape of the inward wing portion 91a and the sub-inward wing portion 91c. The third die 105 is movable into and from the opening 101 of the first die 102 in response to the reciprocative movement of the second die 104.

In operation, the molding 9 will be produced in the order of the side molding part 9C, corner molding part 9B, upper molding part 9A, on one side corner molding part 9B, and side molding part 9C on another side. All of the molding parts 9A to 9C are extruded by the molding machine in the shape of strip.

The first to third dies 102, 104, 105 are mutually positioned as shown in FIG. 21 to form a side molding part 9C. A strip of thin metallic foil is inserted into the opening 101 of the first die 102 at a position corresponding to the connecting portion 92 of the molding 9. Firstly, the plastic material is extruded through the opening 101 of the first die 102, thereby forming a leading end (shown right-hand in FIG. 15) of the side molding part 9C (having the cross-sectional shape as shown in FIG. 17). Under this condition, the distance between the inward wing portion 91 and the sub-inward wing portion 91c is largest, and the water drain channel 98 widest and deepest.

The side molding part 9C is extruded to a specified length. Then, the second die 104 is moved downwardly in the direction X as shown in FIG. 21, thereby decreasing the area of the opening 101 corresponding to the inward wing portion 91a and the sub-inward wing portion 91c. As the area of the opening 101 corresponding to the inward wing portion 91a and the sub-inward wing portion 91c decrease closer, the third die 105 is retracted in the direction W as shown in FIG. 21 in timed relation with the movement of the second die 104, thereby decreasing the depth and width of the opening of the water drain channel 98. Under these conditions, the inward wing portion 91a and the sub-inward wing portion 91c remain uniform in thickness through the entire molding 9.

When the entire side molding part 9C becomes long as predetermined, the third die 105 begins to move away from the opening 101 of the first die 102 and to form a corner molding part 9B as shown in FIG. 20. Under this condition, the water drain channel 98 begins to disappear on the inward wing portion 91a and the sub-inward wing portion 91c as shown in FIG. 16.

When the corner molding part 9B is extruded to the specified length, the third die 105 completely moves away from the opening 101 of the first die 102, and the second die 104 moves further downward in the direction X as shown in FIG. 19. Then the upper molding part 9A will be extruded to the specified length.

The foregoing operations of the first and second movable dies 104, 105 are repeated to extrude the corner and side molding parts 9B, 9C on another side in the order named in the integral form. If the slanted edge of the third die 105 is very sharp, a water drain channel can be made on the relatively thin corner molding parts 9C.

A molding 110 according to a fourth embodiment is shown in FIG. 22 to 24. The molding 110 comprises an exterior wing for covering the space between the windshield 11 and the window opening of the vehicle body panels 12, 13. The exterior wing includes an inward wing portion 115 and an outward wing portion 117. The molding 110 is attached to the roof panel 12 and pillar panel 13 via a fastener 112 by an adhesive tape 111. The fastener 112 is U-shaped, including a flexible lip 112a to extend along slanted walls 12a, 13b to cover the edges of the roof panel 12 and the pillar panel 13. A member 114 extending from the connecting portion 113 is received in the U-shaped fastener 112 to fasten the molding 110.

In this embodiment, the vehicle body panels 12, 13 are substantially flush with the upper surface of the windshield 11. Therefore, the molding 110 has a uniform cross-sectional shape at the upper and corner molding parts 110A, 110B. At the side molding part 110C, the inward wing portion 115 gradually bulges to form a sub-inward wing portion 116 thereunder. The configuration of the inward wing portion 115 and the sub-inward wing portion 116 is similar to those shown in FIGS. 14 and 17, and will not be described here. The outward wing portion 117 is flexibly contacted to the vehicle body panels 12, 13 via the flexible lip 112a of the fastener 112.

The molding 110 of this embodiment is as effective as the moldings of the foregoing embodiments, and will be attached to the vehicle as described above.

The foregoing moldings are also applicable to attach a rear window of the vehicle.

FIGS. 25 to 29 show a molding 120 according to a fifth embodiment of this invention. The molding 120 comprises side, corner, upper, corner and side molding parts 120C, 120B, 120A, 120B, 120C, being extruded as one unit. Each molding part comprises an exterior wing 121 and a connecting portion 122 extending from the exterior wing 121. The exterior wing 121 includes an inward wing portion 121a and an outward wing portion 121b similarly to the moldings described above.

Figure 27:
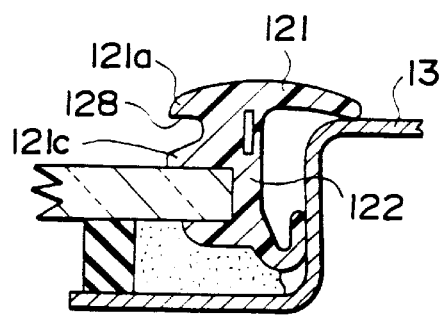
FIG. 27 is a cross-sectional view taken along line 27—27 of FIG. 25.
Figure 28:
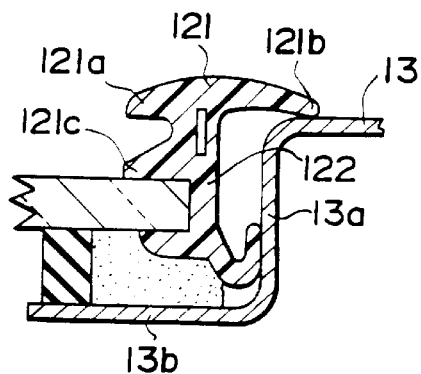
FIG. 28 is a cross-sectional view taken along line 28—28 of FIG. 25.
Figure 29:
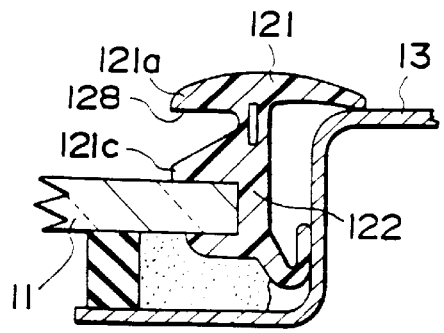
FIG. 29 is a cross-sectional view taken along line 29—29 of FIG. 25.

The molding 120 is gradually heightened between the corner molding part 120B and the side molding part 120C as shown in FIGS. 27 and 28, having the largest height between the central side molding part and the end of the side molding part 120C. Specifically, the molding 20 varies its height in two steps toward the center of the side molding part 120C as shown in FIGS. 28 and 29.

A core metal is embedded at the joint between the exterior wing 121 and the connecting portion 122. The connecting portion 122 has a foot 124 and a flexible lip 125 extending from the end thereof. The foot 124 supports the peripheral edge of the windshield 11. The flexible lip 125 is in flexible contact with the wall 112a of the vehicle body panel 12 (or 13).

The inward wing portion 121a and outward wing portion 121b are in the shape of lip to cover the peripheral edge of the windshield 11 and the edge of the vehicle body panels 12, 13, respectively. At the upper and corner molding parts 120A, 120C, the foot 124 of the connecting portion 122 and the inward wing portion 121a form a U-shaped space to receive the peripheral edge of the windshield 11.

At the majority of the side molding part 120C, the molding 120 is gradually varying its height according to the difference of height between the vehicle body panel 13 and the upper surface of the windshield 11. A sub-inward wing portion 121c is formed between the inward wing portion 121a and the foot 124 of the connecting portion. The U-shaped space for receiving the windshield 11 remains the same between the foot 124 and the sub-inward wing portion 121c at the side molding part 120C.

The outward wing portion 121b has the uniform shape and thickness throughout the molding parts 120A to 120C.

Between the center and the end of the side molding part 120C, the distance between the inward wing portion 121a and the sub-inward wing portion 121c is the largest according to the difference of height between the upper surface of the windshield 11 and the vehicle body panel. A water drain channel 128 is formed between the inward wing portion 121a and sub-inward wing portion 121c, being widest and deepest at this region. The depth and width of the water drain channel 128 depends upon the varying distance between the inward wing portion 121a and the sub-inward wing portion 121C as shown in FIGS. 27 to 29.

Figure 26:
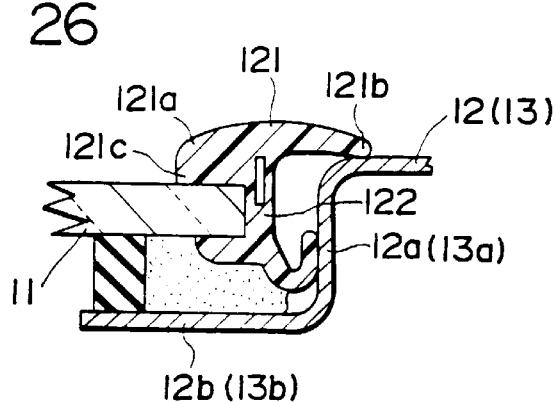
FIG. 26 is a cross-sectional view taken along line 26—26 of FIG. 25.

Near the corner molding part 120B, the inward wing portion 121a and the sub-inward wing portion 121c merge to be slightly thicker than at the upper molding part 120A, so that the water drain channel 128 disappears as shown in FIG. 26. No water drain channel exists at the upper molding part 120A. The inward wing portion 121a is in contact with the upper surface of the windshield 11.

Figure 30:
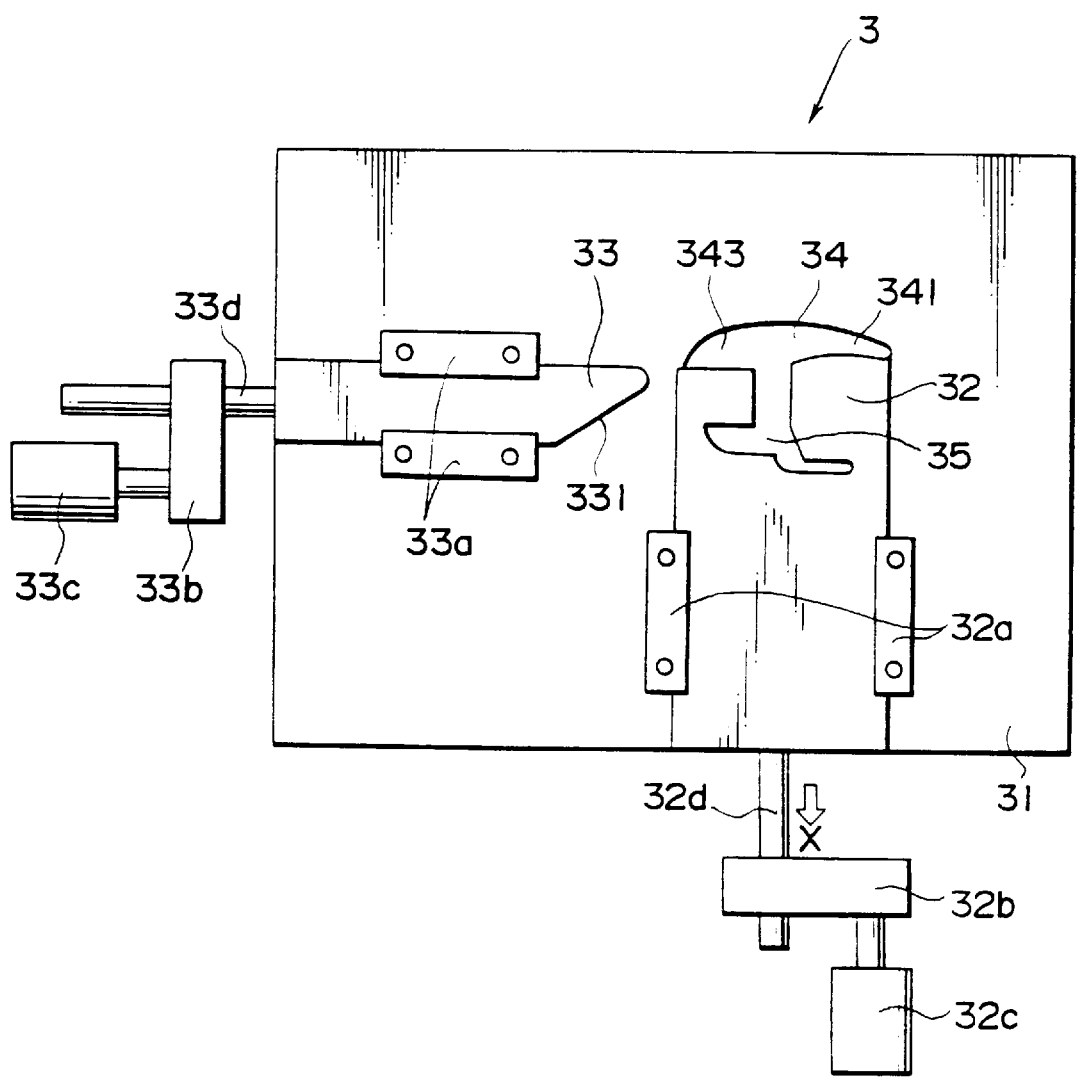
FIG. 30 is a front elevational view of an injection molding machine for making the molding of FIGS. 25 to 29.
Figure 32:
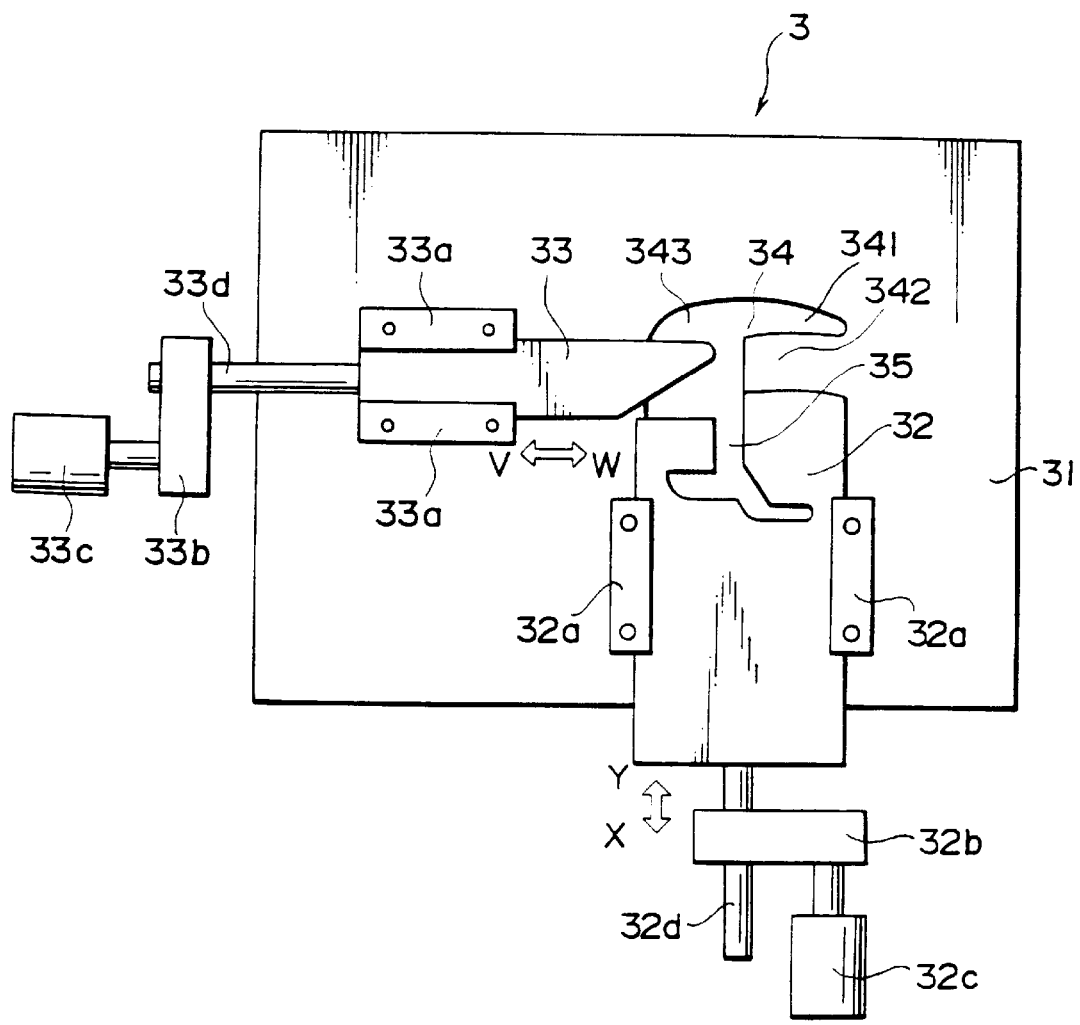
FIG. 32 is a view similar to FIG. 31 showing the operation of the molding machine of FIG. 30.

The molding 120 is produced by a molding machine 3 shown in FIGS. 30 to 32. The molding machine is similar to that shown in FIGS. 7 and 8.

Production of the side molding 120C will be described by referring to FIG. 32. Firstly, the second and third dies 32, 33 are placed on the first die 31 so that the openings 34 and 35 of the first and second dies are in the cross-sectional shape of the side molding part 120C. The plastic material is extruded through the openings 34 and 35 together with a metal foil strip 123 inserted at a portion corresponding to the connecting portion 12 of the opening 34. In this case, the distance between the openings 343 and 345 are longest. The plastic material is extruded to form an end of the side molding part 120C (right-hand side of FIG. 25). In other words, the distance between the inward wing portion 121a and the sub-inward wing portion 121c is largest to form a water drain channel 128 so that the side molding part 120C have the cross-sectional shape as shown in FIG. 29.

The plastic material is extruded to a preset extent under this condition. Then the second die 32 is being raised in the direction Y. The opening 34 of the first die 31 gradually decrease the area. The other portions of the side molding part 120c remain the same.

The third die 33 is retracted in the direction V as the inward wing portion 121a and the sub-inward wing portion 121C become closer to decrease the size of the water drain channel 128. Thus the third die 33 moves in timed relation with the second die 32. The thickness of the sub-inward wing portion 121c and the inward wing portion 121a respectively remain uniform through the entire molding 120. The other portions of the side molding part 120C are being shaped without any change.

When the first, second and third dies are related as shown in FIG. 31, the third die 33 is stopped temporarily to extrude the central region of the side molding part 120C to the specified extent. When the side molding part 120C is extruded to the specified length and a corner molding part 120B is to be formed, the second die 32 is raised again in the direction Y and the third die 33 is retracted to the direction V. Then, the distance between the portions 343 and 345 are reduced in size, thus the distance between the inward wing portion 121a and the sub-inward wing portion 121c are reduced and the size of the water drain channel 128 is reduced. Under this condition, the other portion of the side molding part 120C remain unchanged. Since the third die 33 moves in synchronization with the second die 32, the inward wing portion 121a and the sub-inward wing portion 121c remain uniform in thickness through the entire molding 120. When the third die 33 moves away completely from the openings 343, 345 of the first die 31 after the second die 32 is further raised in the direction Y, the inward wing portion 121a merges with the sub-inward wing portion 121c, so that the water drain channel 128 disappears completely.

Then, the corner molding part 120B is extruded to the specified length. The second and third dies 32, 33 reach the positions as shown in FIG. 30.

The top of the shield 342 of the first die 31 and the upper edge of the second die 32 are flush with each other, i.e. the shape of the openings 34 and 35 matched together corresponds to the cross-sectional shape of the upper molding part 120A. Under this condition, the plastic material is extruded through the openings 34 and 35 for a predetermined period of time to produce the upper molding part 120A.

When the upper molding part 120A becomes long as specified, production of the corner molding part 120B and the side molding part 120C on another side in the other named is started. Thus the molding 120 is produced in the shape of a strip.

Figure 33:
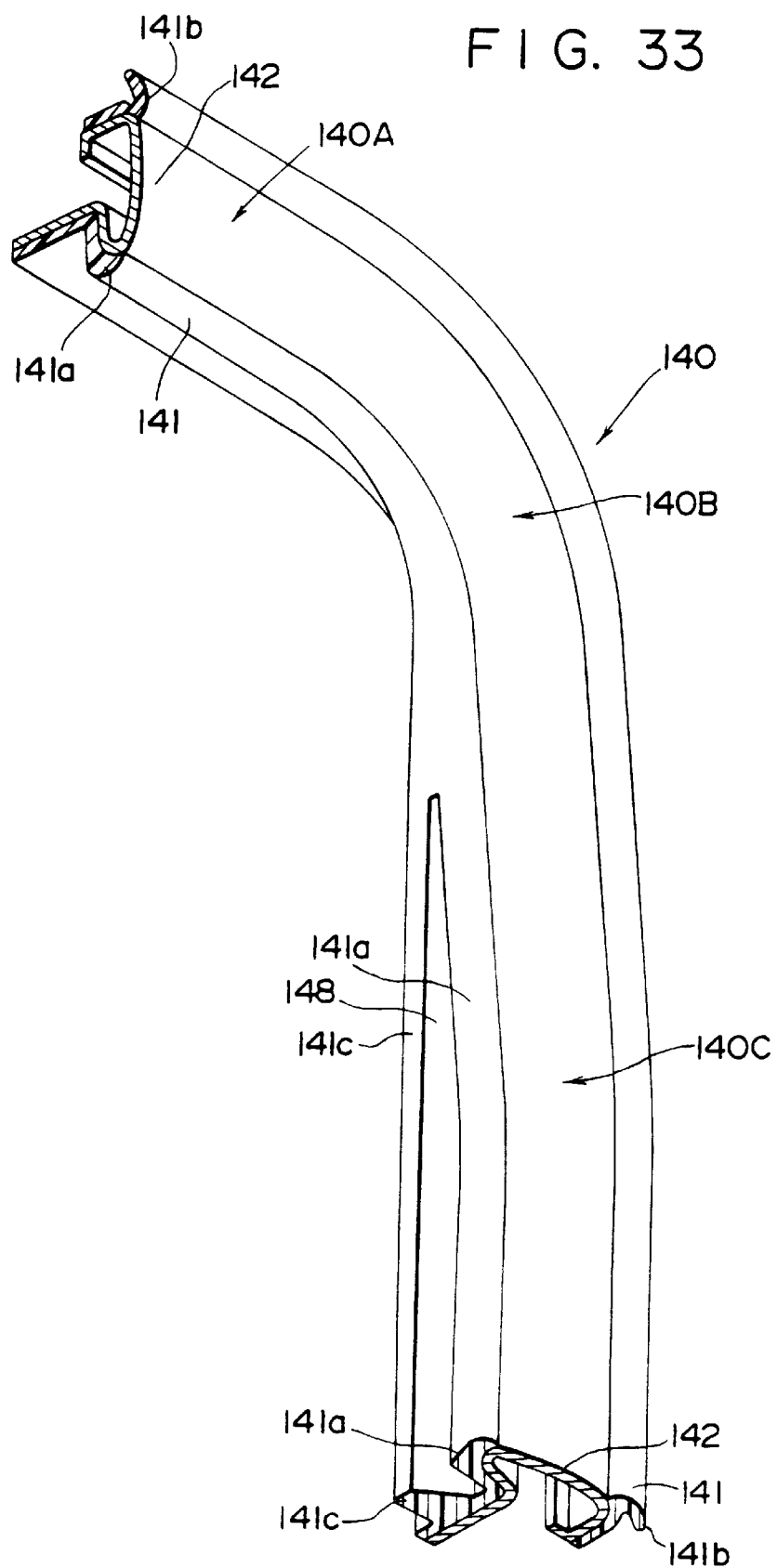
FIG. 33 is a perspective view of a molding according to a sixth embodiment.
Figure 34:
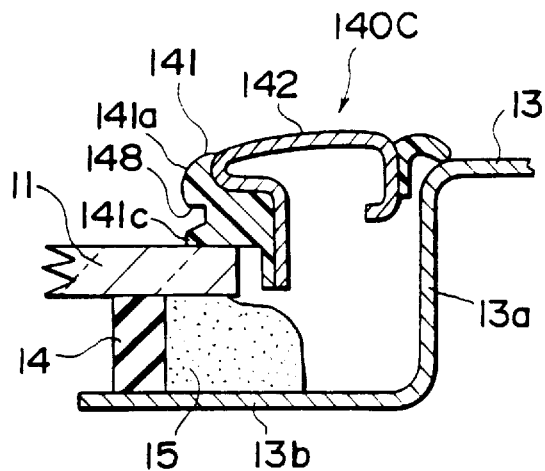
FIG. 34 is a cross-sectional view showing an upper portion of a side molding part of FIG. 33.
Figure 35:
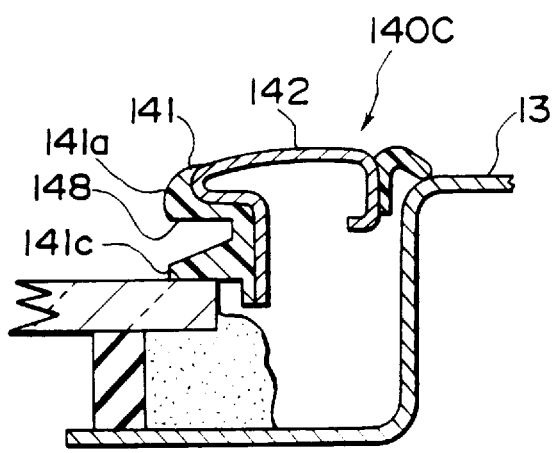
FIG. 35 is a cross-sectional view showing a central portion of the side molding part of FIG. 33.
Figure 36:
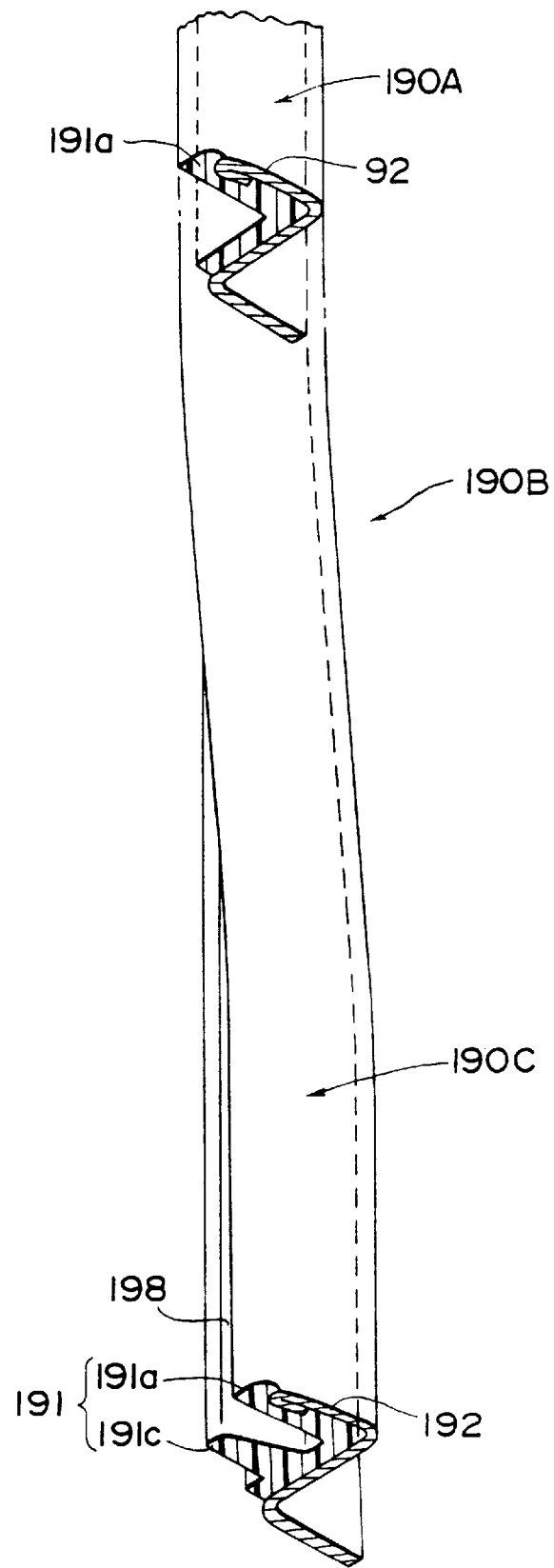
FIG. 36 is a perspective view showing a molding according to a seventh embodiment.
Figure 37:
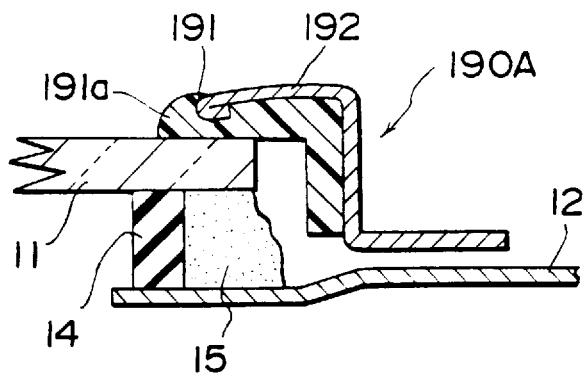
FIG. 37 is a cross-sectional view showing an upper molding part of FIG. 36.

FIG. 33 to FIG. 35 show still another molding according to a sixth embodiment of the invention. A molding 140 comprises a metal frame 142 and a plastic molding member 141 extruded along the metal frame 142. The metal frame 142 is bent according to a space between the window opening of the vehicle and the windshield 11, being attached to the body panels 12, 13 along the window opening by fasteners such as clips and bolts. The metal frame 142 has a uniform cross-sectional shape in its longitudinal direction. The metal frame 142 confronts with the side edge of the windshield with some space therebetween at the side molding part according to the difference of height between the vehicle body panel and the upper surface of the windshield 11.

The plastic molding member 141 covers the peripheral edge of the windshield 11, including a portion 141a and a portion 141b. The portion 141a extends over the edge of the windshield 11, and the portion 141b covers the edge of the body panels 12, 13. At the upper molding part 140A, the portion 141a is in close contact with the surface of the windshield 11. At the side molding part 140C, the portion 141a and the metal frame 142 are away from the windshield 11.

A water drain channel 148 is formed in the space between the portion 141a and sub-portion 141c as the distance between these portions 141a, 141c becomes larger. The sub-portion 141c is in contact with the windshield 11 at the side molding part 140C. The molding member 141 is thickest at the center of the side molding part 140C, being reduced in thickness toward the corner molding part 140B. The water drain channel 148 varies its width and depth depending upon the molding member 141, disappearing at the corner molding part 140B where the portion 141a and sub-portion 141c merge. The portion 141a and the sub-portion 141c have a uniform thickness along the water drain channel 148.

The molding 140 of this embodiment is as effective as those of the foregoing embodiments.

FIGS. 36 to 39 show a molding 190 according to a seventh embodiment. The molding 190 comprises a pair of extruded side molding parts 190C, corner molding part 190B and an extruded upper-roof molding part 190A. At the corner molding part 190B, the inward wing portion 191a and the sub-inward wing portion 191c close and merge toward each other such that water drain channel 198 is gradually reduced in size until the water drain channel 198 is removed. Each molding part includes a metal frame 192 and a molding member 191 extruded along the metal frame 192. The molding member 191 has a portion 191a for covering the edge of the windshield 11. At the upper molding part 190A, the portion 191a is in contact with the surface of the windshield 11.

The metal frame 192 has a uniform shape throughout the molding parts 190A to 190C. The frame 192 is arranged to be somewhat apart from the windshield 11 at the side molding part 190C according to the difference of height between the upper surface of the windshield 11 and the body panels 12, 13.

Figure 38:
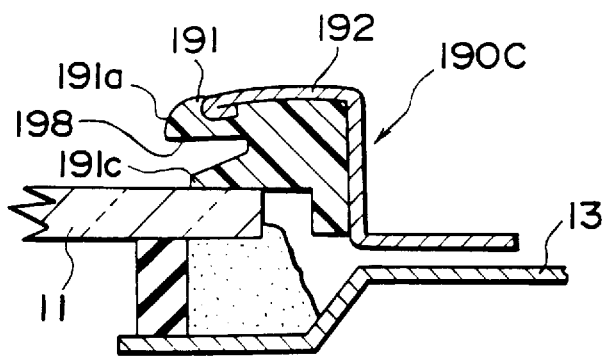
FIG. 38 is a cross-sectional view showing an upper portion of a side molding part of FIG. 36.
Figure 39:
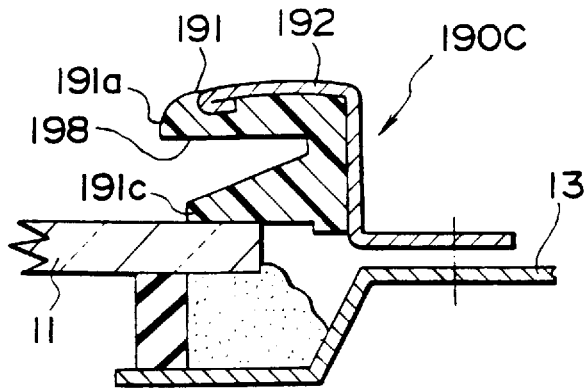
FIG. 39 is a cross-sectional view showing a lower portion of the side molding part of FIG. 36.

At the majority of the side molding part 190C, the distance between the portion 191a and the sub-portion 191c gradually becomes larger so that a water drain channel 198 is formed therein, as shown in FIGS. 38 and 39. Specifically, the water drain channel 198 is defined between the portion 191a and sub-portion 191c. The thickness of the portion 191a and the sub-portion 191c remain the same along the water drain channel 198. The size of the water drain channel 198 depends upon the varying distance of the portion 191a and the sub-portion 191c.

It is needless to say the moldings according to the invention are applicable to installation of a rear window.

A further embodiment of the present invention will now be described with respect to FIGS. 40–53.

Figure 40:
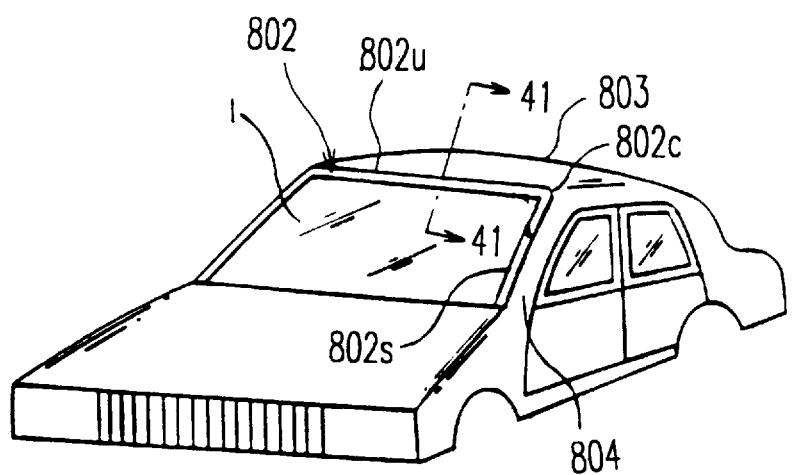
FIG. 40 is a front perspective view of a vehicle body having a windshield molding.

As shown in FIG. 40, a windshield molding 802 composed of long belt-shaped extruded sealing members is installed along the periphery of the front windshield 1 of an automobile. This windshield molding 802 has an upper molding section 802U which is installed in a space between an upper edge of the above-mentioned windshield 1 and a roof panel 803, a pair of side molding sections 802S which are installed in the space between both side edges of the windshield 1 and the pillar panels 804, and a pair of curved corner molding sections 802C connecting the upper molding section 802U and the side molding sections 802S. These moldings 802U, 802C and 2S are formed continuously as a single molding piece by extrusion as described later herein.

Figure 41:
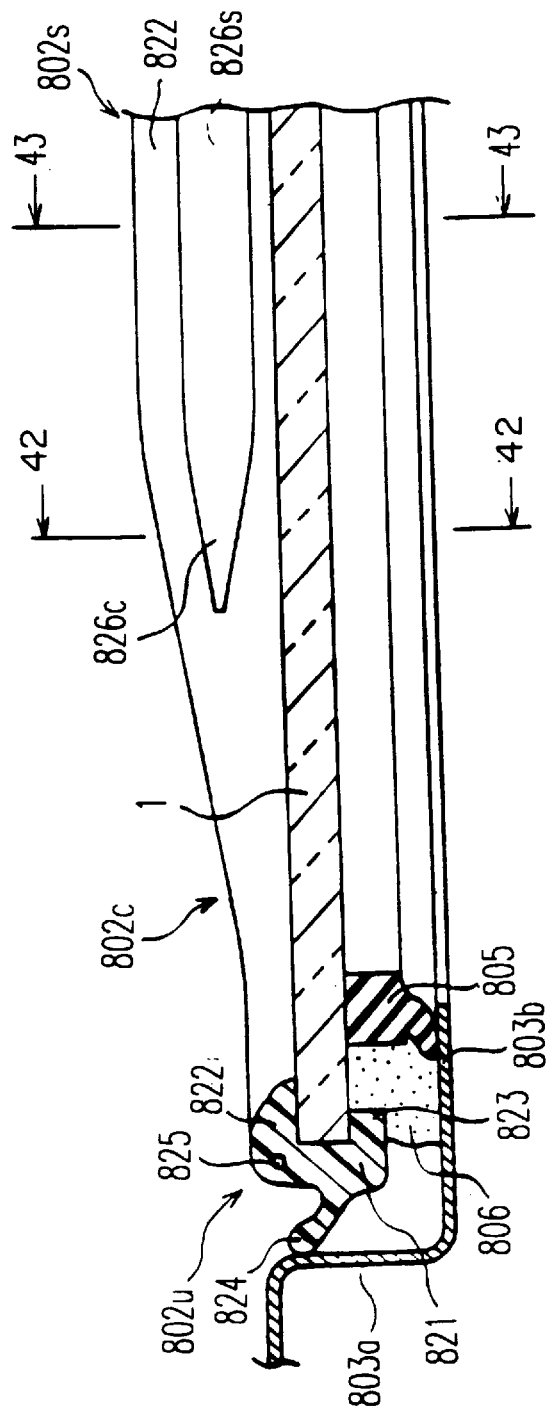
FIG. 41 is an elevational view of a molding according to an eighth embodiment of the present invention.

The windshield molding 802 in the embodiment shown in FIGS. 41 to 43 is made of elastic material such as rubber and synthetic resin, etc., into a long belt-shaped solid molding with the extrusion device described later herein, is provided with the connecting portion 821 which is inserted in the spaces between the periphery of the windshield 1 and both the roof panel 803 and the front pillars 804, and is provided with the exterior wing 822 which covers the spaces between the windshield 1 and both the outside surface of the roof panel 803 and the front pillars 804 from the exterior side (the upper end of FIG. 43).

At the side molding section 802S (shown in FIGS. 41 and 43) the thickness of the exterior wing 822 is maintained in the maximum size from the upper end to the lower end of the side section according to the maximum and uniform height difference from the upper end to the lower end of the side section.

At this time, a U-shaped groove between the exterior wing 822 and the foot 823 is fitted with the periphery section of the windshield 1 throughout the entire length, and the elastic lip 824 is bent in an L shape and fixed to the bent walls 803a and 804a of the vehicle body panels 803 and 804. The elastic rebound force caused by bending the elastic lip 824 works as the fixing force of the windshield molding 802.

As described above, since the thickness of the exterior wing 822 in the cross-sectional shape of the molding 802 is varied according to the vary of the height difference between the windshield 1 and the vehicle body panels 803, 804, it is suitably performed to install the molding 802 at every section.

In the case of the described structure for installing the molding 802 to the windshield 1 on the vehicle body, rainwater falling on the windshield 1 is led to the inner peripheral wall of the exterior wing 822 and the rainwater collected in the side molding section is led through the water drain channel 826 (between sections 822a and 822b) formed on the dam portion and drained at the specified portion.

The following explains the extrusion device for forming the above-mentioned windshield molding 802.

Figure 44:
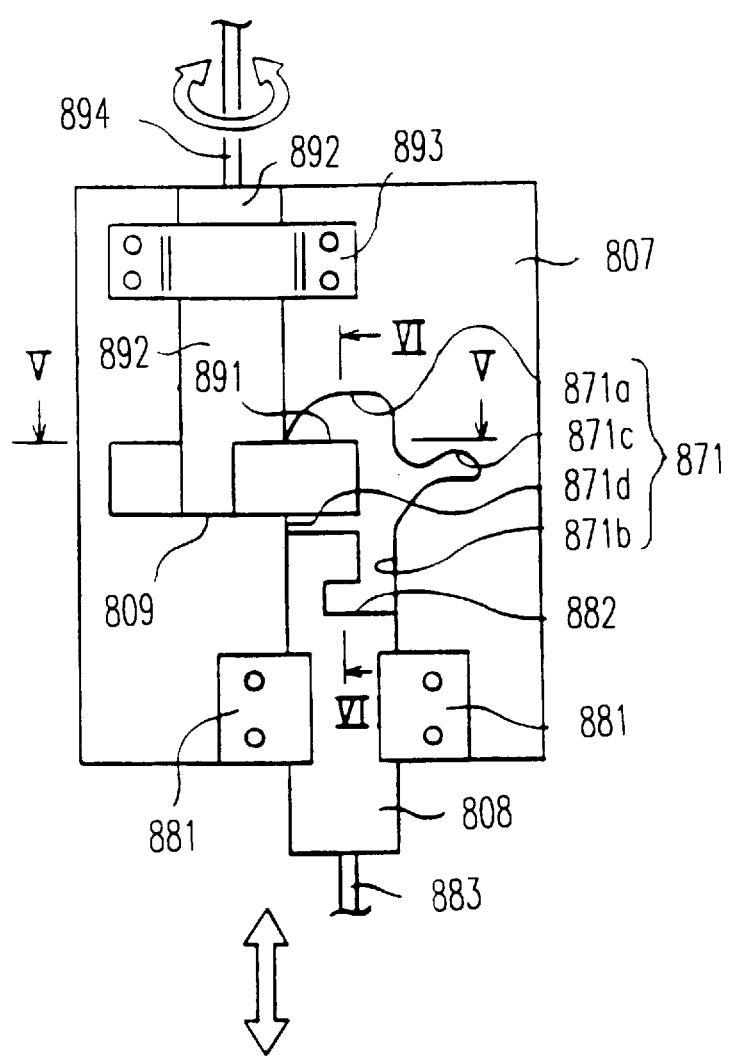
FIG. 44 is an elevational view of an injection molding machine for making the molding of FIGS. 41–43.
Figure 45:
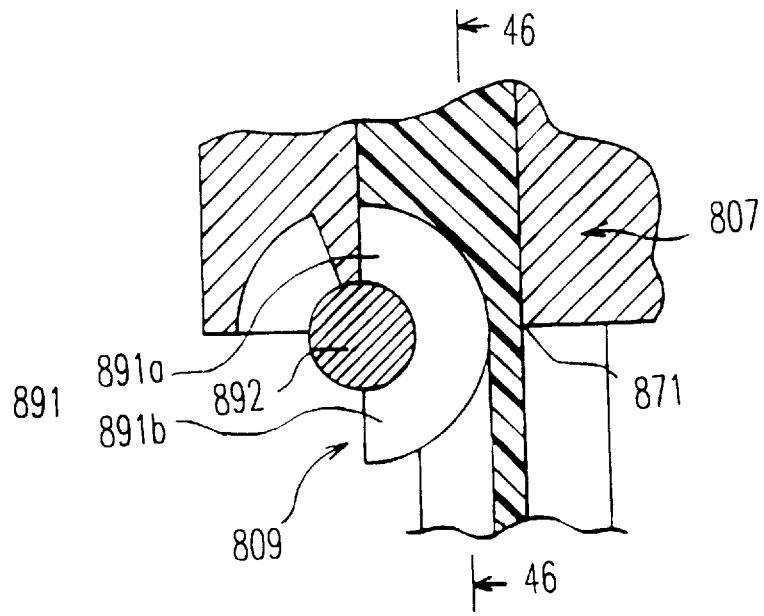
FIG. 45 illustrates a feature of the molding forming device of FIG. 44.
Figure 46:
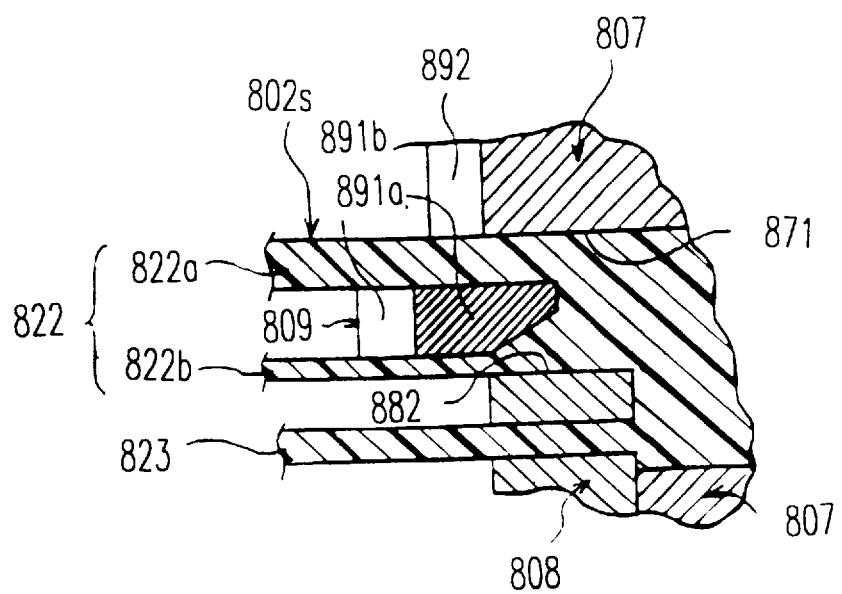
FIG. 46 illustrates a further view of the molding device of FIG. 44.

As FIGS. 44 to 46 show, the molding forming device unit is fitted with three dies having openings for extruding synthetic resin. These dies are a first die 807, second die 808 and third die 809 arranged in the molding extruding direction (vertical direction on the paper) so as to define an extrusion opening for extruding the molding 802. The first die 807 is fixed and has an extrusion opening having an extrusion edge 871 which comprises an extrusion edge 871a corresponding with the exterior surface of the exterior wing 822, an extrusion edge 871d corresponding with the inner surface of the exterior wing 822, an extrusion edge 871b corresponding with the outer surface of the connecting portion 821, and an extrusion edge 871c corresponding with the elastic lip 824. At this time, the section of the extrusion opening corresponding with the inner and lower end surface of the connecting portion 821 takes an enlarged opening shape including the whole shape of the lower portion in the cross-sectional shape of the molding 802.

The second die 808 is made of a plate-like member and is supported on the front surface of the first die 807 so as to be able to move linearly by guiding with a pair of guide members 881, 881. The second die 808 has an extrusion edge 882, at the upper edge thereof, notched in the shape corresponding with the lower end surface of the connecting portion 821. The extrusion edge 882 of the second die 808 is arranged to be successive to the extrusion edge 871 of the first die 807.

The second die 808 has, at the lower portion, an operation lever 883 which is connected to a motor via a non-illustrated converter for converting rotary motion of the motor into rectilinear motion. When driven by motor, the second die 808 reciprocates between a position for forming the side molding section shown in FIG. 44, the corner molding section shown in FIG. 47 and the upper molding section shown in FIG. 51, respectively.

Further, the third die comprises a short-axis cylindrical portion 891 having a half-round cylinder notched in a part thereof and a long-axis cylindrical portion 892 arranged to turn the short-axis cylindrical portion 891. The long-axis cylindrical portion 892 is supported on the front of the first die 807 so as to be able to rotate by guiding with a guide member 893. The axis of the short-axis cylindrical portion 891 is arranged in a vertical position to be connected to the lower end of the long-axis cylindrical portion 892 so as to turn with the short-axis cylindrical portion 891 in one body.

The notched part of the short-axis cylindrical portion 891 is formed as a shield part which is arranged to advance into and retract out of the extrusion opening defined by the first and second dies 807 and 808. That is, the shield part of the short-axis cylindrical portion 891 has a front changing portion 891a which has a cross-sectional shape corresponding with the shape of the water drain channel 826C at the corner molding section 802C and a back constant portion 891*b* which has a cross-sectional shape corresponding with the shape of the water drain channel 826S at the side molding section 802S.

In a little more detail, the front-end of the front changing portion 891*a* has a minimum triangular shape corresponding with the minimum shape of the water drain channel 826C at the corner molding section 802C, and has a gradually enlarged triangular cross-sectional shape on its round way toward the back end thereof corresponding with the triangular cross-sectional shape of the water drain channel 826C gradually expanded toward the side section. The back constant portion 891*b*, more than approximate 90 degrees angle away in a round direction from the front end of the front changing portion 891*a*, has a constant rectangular shape corresponding with the shape of the water drain channel 826S at the side molding section 802S.

Figure 47:
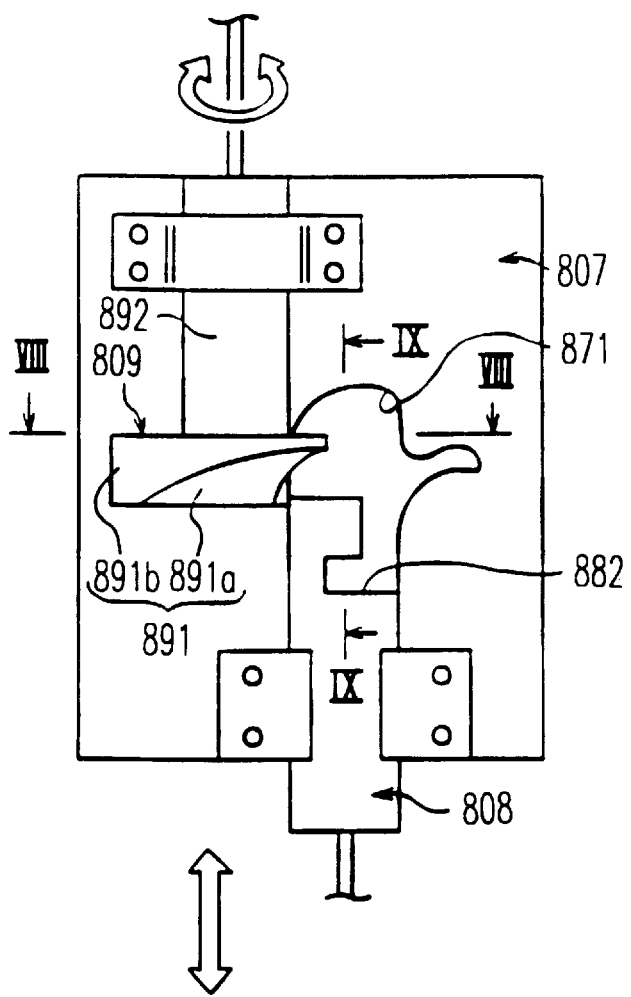
FIG. 47 is a further elevational view of the injection molding machine of the present invention.
Figure 48:
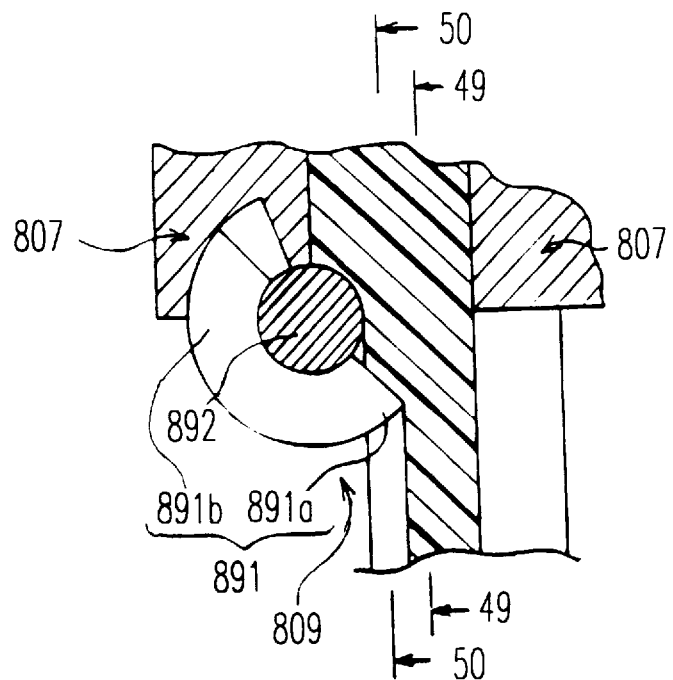
FIG. 48 is a further view of a feature of the molding machine of the present invention.
Figure 49:
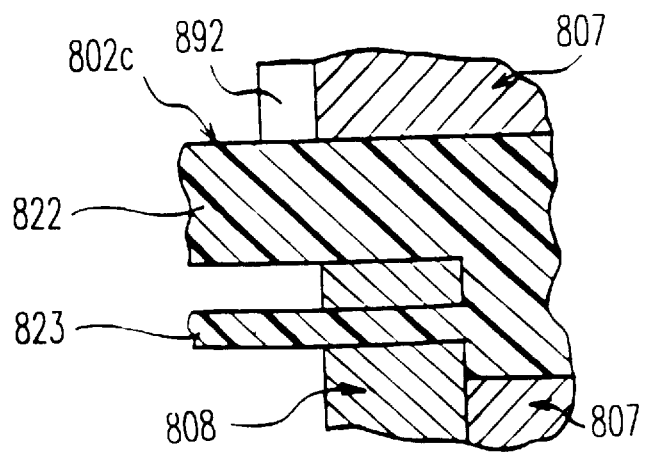
FIG. 49 is a further view of a feature of the molding machine of the present invention.
Figure 50:
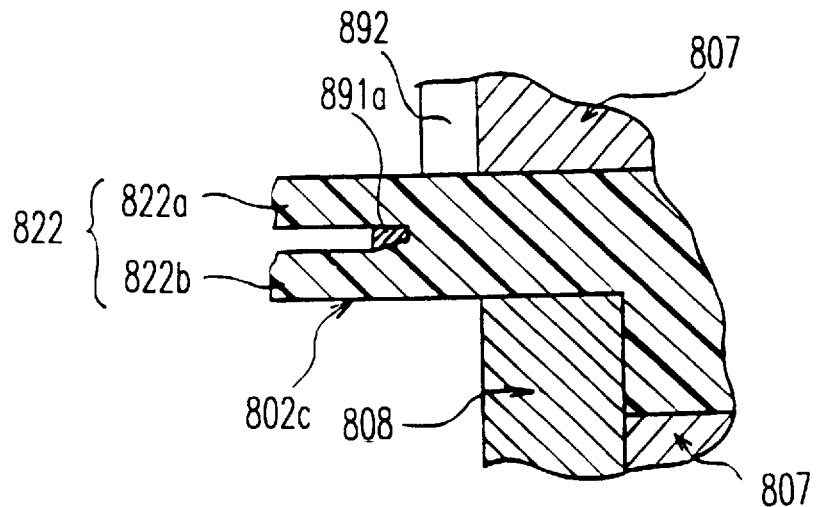
FIG. 50 is a view of a further feature of the molding machine of the present invention.
Figure 51:
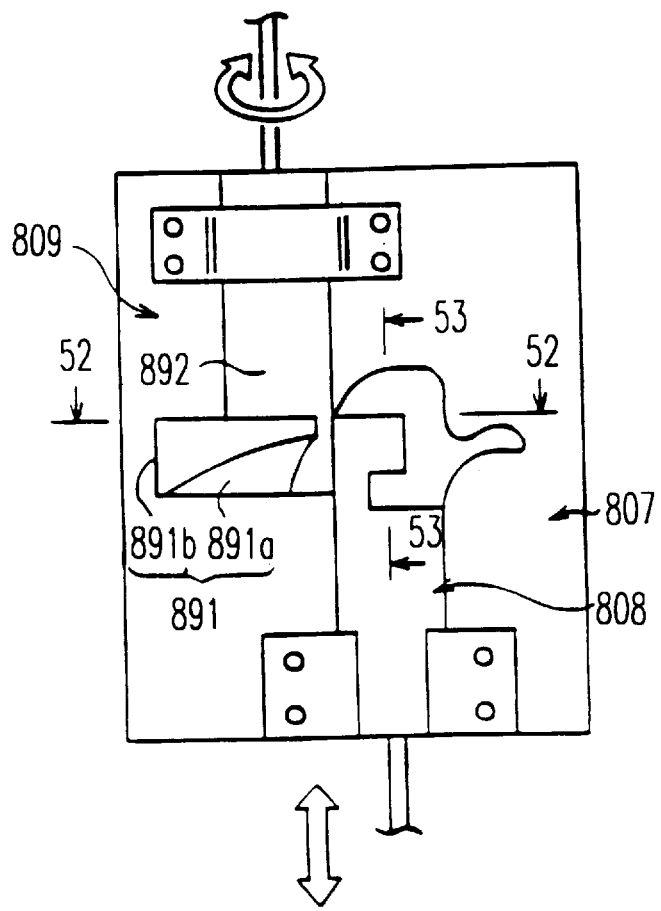
FIG. 51 is a further elevational view of the molding machine of the present invention.

The short-axis cylindrical portion 891 of the third die 809 turns a half-turn between positions for forming the rectangular shape at the side molding section shown in FIG. 44, the triangular shape at corner molding section shown in FIG. 47 and upper molding section shown in FIG. 51, respectively. The third die 809 has, at the upper portion thereof, an operation lever 893 which is connected to a motor so as to turn into or out of the extrusion opening in synchronization to the rectilinear motion of the second die 808.

The following explains the production method of the windshield molding 8002 with the above-mentioned molding extrusion device.

To produce the windshield molding 802, the upper molding section 802U, the corner molding section 802C, and the side molding section 802S are extruded as a single molding in one piece, which is produced in the order of the molding section 802S, the corner molding section 802C, the upper molding section 802U, another corner molding 802C, and another side molding section 802S.

When the side molding section 802S is extruded, the second die 808 and the third die 809 are positioned with respect to the first die 807, as shown in FIGS. 44 to 46, so that the extrusion opening of the first die 807 is maintained in the maximum opening area. Feeding the inserted wire 825 to the extrusion opening of the first die 807, extrusion starts from the lower end (the right end portion in FIG. 43) of the side molding section 802S. At this time, the exterior wing 822 is obtained with the cross-sectional shape of the maximum expanded thickness. The water drain channel 826S also has the maximum rectangular cross-sectional area to insure the maximum of the flowing capacity.

After the side molding section 802S is extruded to a certain length in a constant sectional form, at a point corresponding with the upper end of the side molding section 802S the short-axis cylindrical portion 891 of the third die 809 begins to turn back and the second die 808 starts to move upward as shown in drawings so as to start to extrude the corner molding section 802C.

At the forming position for the corner molding section 802C, as shown in FIGS. 47 to 50, extrusion is performed in such a manner that the short-axis cylindrical portion 891 of the third die 809 turns back and the second die 808 moves upward. With this motion, the shielding amount of the extrusion opening of the first die 807 corresponding with the exterior wing 822 gradually reduces so that the thickness of the expanded thick section of the exterior wing 822 gradually decreases. In synchronization with this extruding operation, the cross-sectional shape of the water drain channel 826, which is varied from the rectangular shape (826*s*) to the triangular shape (826*c*), gradually decreases.

At a midpoint in the corner molding section 802C, the short-axis cylindrical portion 891 of the third die 809 completely leaves from the extrusion opening such that the water drain channel 826C disappears. The second die 808 further moves upward as shown in the drawings and the extrusion of the upper molding section 802U is started when the thickness of the exterior wing 822 becomes to the minimum size.

Figure 52:
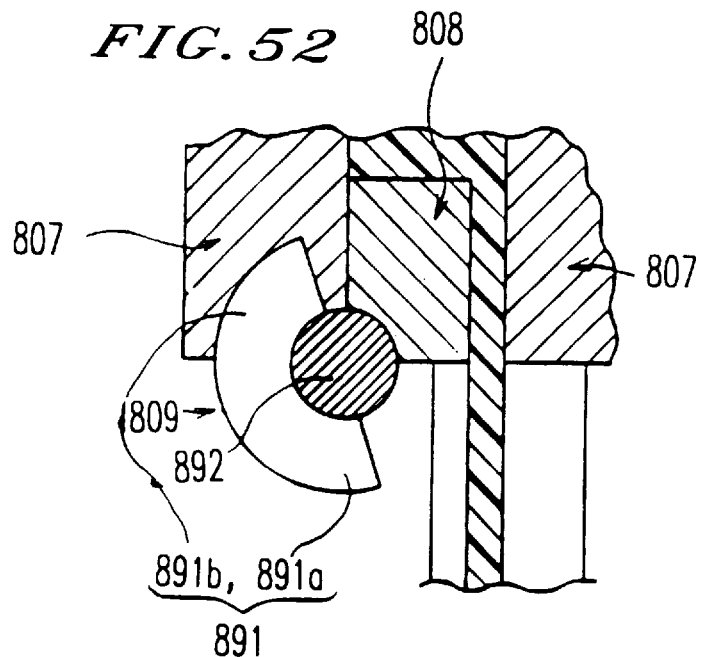
FIG. 52 is a view of a feature of the molding machine of the present invention.
Figure 53:
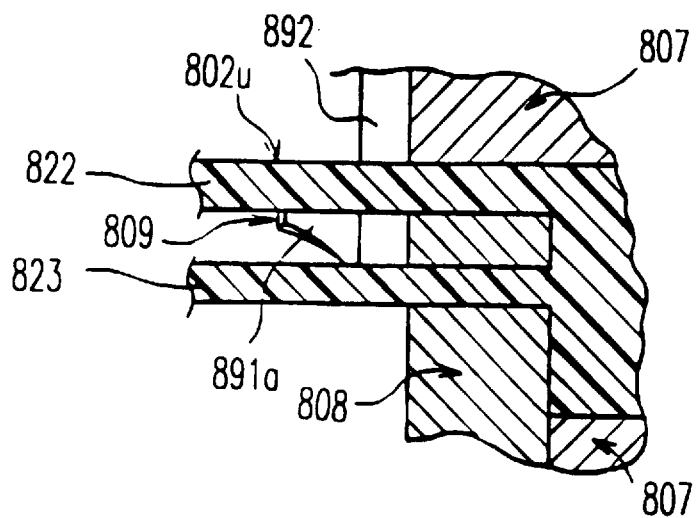
FIG. 53 is a further view of a feature of the molding machine of the present invention.

That is, when the extrusion of the corner molding section 802C is completed, the second die 808 and the third die 809 halt at the final decrease position, as shown in FIGS. 51 to 53. Then, the extrusion opening takes the shape for the cross-sectional shape of the upper molding section 802U. From this time on, the upper molding section 802U is extruded with a certain cross-sectional shape over a necessary length.

When the upper molding section 802U is extruded in a certain length, the other corner molding section 802C and the other side molding section 802S are molded in the procedure opposite to the one described above. Thus, the windshield molding 802 is successively obtained in one piece.

It is possible to properly control the variation and start-end timing with respect to the water drain channel 826 so as to form various moldings by combination of the operation timing.

As mentioned above, in the windshield molding relating to this embodiment, the water drain channel varies in the cross-sectional shape according to the thickness of the exterior wing. That is, the cross-sectional shape of the water drain channel has the rectangular shape to obtain a maximum capacity of flowing space in the section having the maximum thickness and has the triangular shape to reduce the capacity of flowing space in the section reduced in the thickness, therefore, it is possible to form the water drain channel in the section reduced in the thickness so as to improve the function of the water drain channel.

Further, in the production method of the windshield molding relating to this embodiment, the entire length of the windshield molding is extruded in succession and the water drain channel is formed efficiently by maintaining a good supplying flow of the extruding material due to the gradual change in the cross-sectional shape of the water drain channel, and to avoid a rapid change of the supplying flow resistance. Therefore, it is possible to extrude a windshield molding having a good appearance efficiently.

What is claimed is:

1. An apparatus for producing an automobile windshield molding for decorating along a periphery of a windshield located in an opening of a vehicle body panel, said automobile windshield molding having an exterior wing extending, when installed, along said periphery of the windshield, a cross-sectional profile of which continuously varies in a longitudinal direction from a second molding section to a first molding section and which has a waterdrain channel in and along the second molding section, said apparatus comprising;

dies for forming an outer surface and an inner surface of the exterior wing and an inner surface of the waterdrain channel by extrusion;

means for gradually changing a position of said dies in a direction perpendicular to an extruding direction when moving from the forming of said second molding section to the first molding section; and means for moving the die for forming the waterdrain channel with distance from the other dies so as to reduce a size of the waterdrain channel from the second molding section to the first molding section;

said die for forming the waterdrain channel comprising a cylindrical portion with a circumferential surface which defines a first triangular portion that corresponds to a shape of the water drain channel at a corner molding section of said second molding section, a second triangular portion which is larger than said first triangular portion that corresponds to a shape of the waterdrain channel at a first side section of said second molding section which extends from the corner molding section, and a constant rectangular portion that corresponds to a shape of the waterdrain channel at a second side section of said second molding section which extends from the first side section.

2. An apparatus for producing an automobile windshield molding according to claim 1, wherein the means for moving the die for forming the waterdrain channel includes means for moving the die for forming the waterdrain channel with distance from the other dies so as to reduce the size of the waterdrain channel from the second molding section to the first molding section while the dies for forming the exterior wing are closing on each other.

3. An apparatus for producing an automobile windshield molding according to claim 1, wherein the dies move so as to make a size of the waterdrain channel reduced in depth.

4. An apparatus for producing an automobile windshield molding according to claim 1, wherein the dies move so as to make a size of the waterdrain channel reduced in depth and width at the same time.

5. An apparatus for producing an automobile windshield molding according to claim 1, wherein the dies for forming the waterdrain channel and the exterior wing move in an interlocked timing with respect to each other.

6. An apparatus for producing an automobile windshield molding according to claim 5, wherein said dies for forming the waterdrain channel move at an earlier timing than the dies for forming the exterior wing.

7. An apparatus for producing an automobile windshield molding according to claim 1, wherein the dies for forming the waterdrain channel are disposed at the same position in an extrusion direction in such a manner that the outer and inner surfaces of the exterior wing are formed.

8. An apparatus for producing an automobile windshield molding according to claim 7, wherein the dies construct a single extrusion opening through which the outer and inner surfaces of the exterior wing are formed.

9. An apparatus for producing an automobile windshield molding according to claim 8, wherein the dies have shielding plates with which the outer and inner surfaces of the exterior wing are formed.

10. An apparatus for producing an automobile windshield molding according to claim 7, wherein the die is disposed at the same position to the other dies in the extrusion direction in such a manner that the inner surface of the exterior wing is formed.

11. An apparatus for producing an automobile windshield molding according to claim 1, wherein the die for forming the inner surface of the exterior wing moves so as to extrude a connecting portion adopted for insertion into a gap between the periphery of said windshield and an inner edge of said window opening.

12. An apparatus for producing an automobile windshield molding according to claim 1, wherein the dies for forming the outer and inner surfaces of the exterior wing define a cross-sectional profile of the first molding section and the second molding section by extruding.

13. An apparatus for producing an automobile windshield molding according to claim 1, wherein the first and second triangular portions and the constant rectangular portion of the die for forming the waterdrain channel move alternatively such that a cross-sectional profile of the water drain channel successively varies between triangular and rectangular shapes of the waterdrain channel.

14. An apparatus for producing an automobile windshield molding according to claim 1, wherein said cylindrical portion defines a short axis cylindrical portion that is connected to a long axis cylindrical portion which is arranged to rotate the short axis cylindrical portion.

\* \* \* \* \*